(12) United States Patent
Counterman

(10) Patent No.: US 8,646,057 B2
(45) Date of Patent: Feb. 4, 2014

(54) AUTHENTICATION AND AUTHORIZATION OF USER AND ACCESS TO NETWORK RESOURCES USING OPENID

(75) Inventor: Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 586 days.

(21) Appl. No.: 12/720,790

(22) Filed: Mar. 10, 2010

(65) Prior Publication Data

US 2011/0225637 A1    Sep. 15, 2011

(51) Int. Cl.
    *G06F 21/00* (2013.01)
(52) U.S. Cl.
    USPC ............ 726/8; 726/1; 726/7; 726/9; 713/155; 713/170; 709/229; 705/76
(58) Field of Classification Search
    USPC ..................................................... 726/1, 7–8
    See application file for complete search history.

(56) References Cited

U.S. PATENT DOCUMENTS

| | | | |
|---|---|---|---|
| 2005/0149726 A1* | 7/2005 | Joshi et al. .................... | 713/164 |
| 2006/0129816 A1* | 6/2006 | Hinton .......................... | 713/169 |
| 2007/0226774 A1* | 9/2007 | Pardo-Blazquez et al. ....... | 726/1 |
| 2007/0233540 A1* | 10/2007 | Sirota ............................... | 705/8 |
| 2007/0234410 A1* | 10/2007 | Geller ............................... | 726/8 |
| 2008/0066168 A1* | 3/2008 | Gregg et al. ..................... | 726/7 |
| 2008/0086764 A1* | 4/2008 | Kulkarni et al. .................. | 726/7 |
| 2008/0307220 A1* | 12/2008 | Campbell ..................... | 713/155 |
| 2009/0307104 A1* | 12/2009 | Weng ............................. | 705/26 |
| 2010/0217780 A1* | 8/2010 | Erola et al. .................... | 707/802 |
| 2010/0312851 A1* | 12/2010 | Jackson et al. ................ | 709/217 |

\* cited by examiner

*Primary Examiner* — Morshed Mehedi

(57) ABSTRACT

A method includes receiving by an OpenID network device a user log in; logging in, by the OpenID network device, the user to an OpenID account; receiving, by the OpenID network device and from a third party service provider network device, a request to authenticate the user and a request to receive user data associated with the user; providing, by the OpenID network device, a user interface to an end device to allow the user to confirm his/her sign-in to the third party service provider network device and release of the user data; receiving, by the OpenID network device, a confirmation with regard to the user's sign-in to the third party service provider network device and release of the user data; and sending, by the OpenID network device and to the third party service provider network device, a message indicating that the user is authenticated and the user data.

21 Claims, 31 Drawing Sheets

YOU ARE SIGNING INTO: TUBS/RPXNOW.COM AS HTTP://RAY-COUNTERMAN.MYOPENID.COM/

CONTINUE

OPTIONS

WORK (RAY COUNTERMAN)

NICKNAME: RAY
EMAIL: RAY.C.COUNTERMAN@ABC.COM
FULL NAME: RAYMOND COUNTERMAN
BIRTHDATE: 06/27/1962
MOBILE PHONE: 617-555-1212
POSTAL CODE: 02451
LANGUAGE: ENGLISH
TIME ZONE: NOT IN PROFILE

[X] SKIP THIS STEP NEXT I SIGN INTO: TUBS/RPXNOW.COM

Fig. 3C

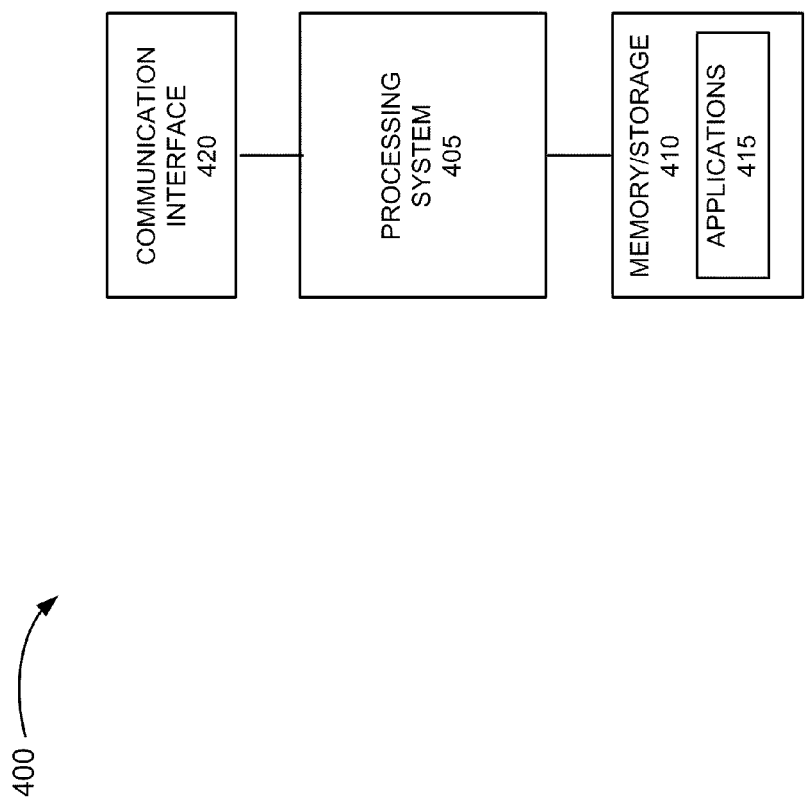

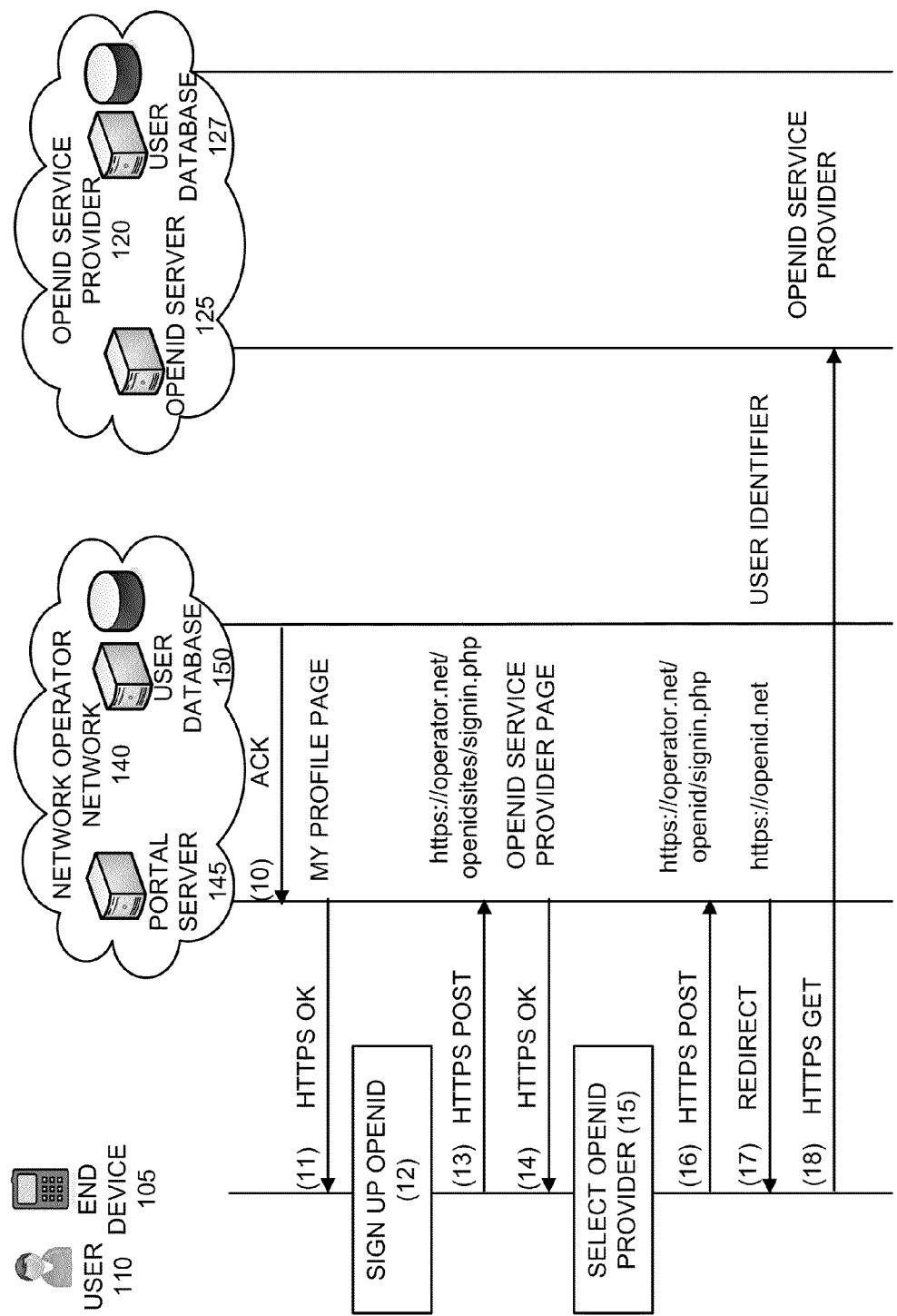

SIGN IN TODAY

SIGN IN TO MY VERIZON BY ENTERING YOUR USER ID
OR CELL PHONE NUMBER AND PASSWORD

USER ID OR CELL PHONE NUMBER 617-555-1212

PASSWORD

********

CONTINUE

FORGOT PASSWORD?
FORGOT USER ID?

> REGISTER

Fig. 8A

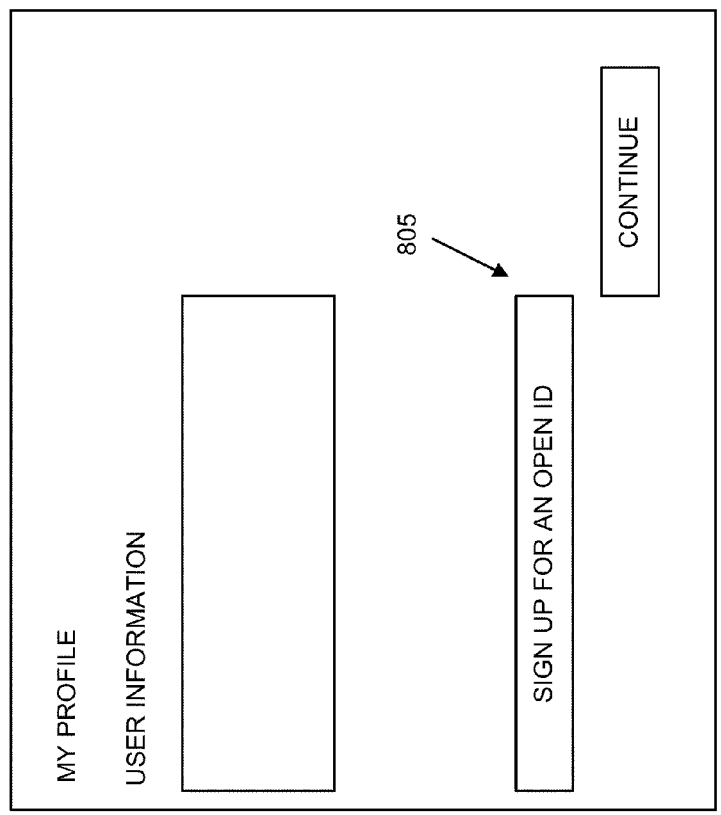

| SELECT AND CONFIRM | OPENID: RAY-COUNTERMAN.VZOPENID.COM |
|---|---|
| ☐ NICKNAME: | RAY |
| ☐ FULL NAME: | RAYMOND COUNTERMAN |
| ☐ DOB: | 06/27/62 |
| ☐ EMAIL: | RAY.COUNTERMAN@VERIZON.COM |
| ☐ CELL: | 617-555-1212 |
| ☐ ADDRESS: | 415 ELM STREET, WALTHAM MA 02451 |
| ☐ TIME ZONE: | EST |
| ☐ HOME PHONE: | 617-435-5896 |
| ☐ OFFICE PHONE: | 617-435-9435 |

Fig. 8D

AUTHENTICATION AND AUTHORIZATION OF USER AND ACCESS TO NETWORK RESOURCES USING OPENID

BACKGROUND

A network operator may possess network resources, such as bandwidth, user location information, contact lists, etc., that may be utilized by third parties. For example, a third party service provider may offer various applications or services to users that may utilize the network operator's resources in order to provide its services to the users. For example, the third party service provider may provide to a user a map of his/her current surroundings. However, the third party service provider may need particular user data (e.g., the user's mobile phone number) in order to request the location of the user from the network operator.

Under such circumstances, the third party service provider may request the user data from the user. However, various problems may arise. For example, the user may provide the third party service provider with incorrect user data, which may be intentional or unintentional. In such cases, the reliability of the user data is problematic and may lead to the violation of a user's privacy rights. Furthermore, without the correct user data, the third party service provider may not be able to obtain or request the network resource (e.g., the location of the user) from the network operator.

BRIEF DESCRIPTION OF THE DRAWINGS

FIGS. 3A-3C are diagrams illustrating exemplary user interfaces that may be implemented according to the exemplary embodiment of the authentication and authorization scheme;

FIG. 4 is a diagram illustrating exemplary components of a device that may correspond to one or more of the devices in the environment depicted in FIGS. 1A-1G;

FIGS. 7A-7D are diagrams illustrating exemplary messages that may be implemented according to the exemplary embodiment of the authentication and authorization scheme;

FIGS. 8A-8D are diagrams illustrating exemplary user interfaces that may be implemented according to the exemplary embodiment of the authentication and authorization scheme.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "network operator," as used herein, is intended to be broadly interpreted to include a network operator or a network service provider that provides access to a network.

The term "OpenID service provider," as used herein, is intended to be broadly interpreted to include a party that provides OpenID services.

The term "third party service provider," as used herein, is intended to be broadly interpreted to include a party, other than the network operator, that provides a service, an asset, a function, etc., to users.

Typically, network operators may obtain and store data related to their users. By way of example, but not limited thereto, network operators may store personal information (e.g., name, address, etc.), equipment-related information (e.g., an international mobile equipment identity (IMEI), a mobile equipment identifier (MEID), a serial number, etc.), contact information (e.g., phone numbers, an email address, etc.), and/or other types of data related to a user. The user data may be considered a part of the network operator's resources and may be useful to the network operator and/or third parties when providing services, applications, functions, and/or other assets to users. As described herein, an authentication and authorization scheme may allow a party (e.g., the third party, the network operator, etc.) to obtain authenticated user data which may be needed to provide services, other assets, etc., to users. Additionally, the authentication and authorization scheme may include receiving authorization from the user to allow the party to use the user data.

Figure 1A:
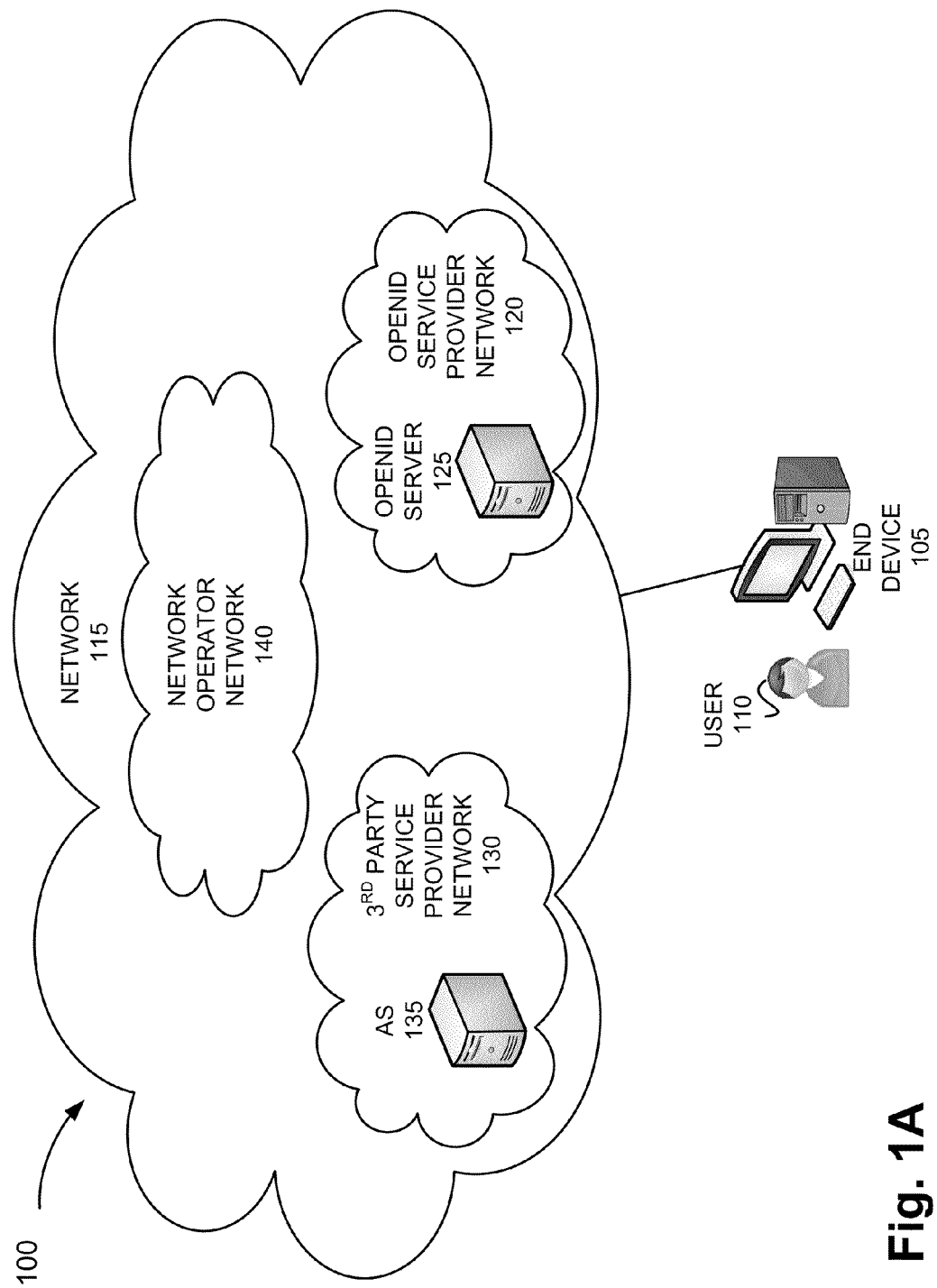
FIG. 1A is a diagram illustrating an exemplary environment in which an exemplary embodiment of an authentication and authorization scheme may be implemented.

FIG. 1A is a diagram illustrating an exemplary environment 100 in which an exemplary embodiment of the authentication and authorization scheme may be implemented. As illustrated, environment 100 may include an end device 105, a user 110, and a network 115. Network 115 may include an OpenID service provider network 120 including an OpenID server 125, a third party service provider network 130 including an application server (AS) 135, and a network operator network 140.

The number of devices and configuration in environment 100 is exemplary and provided for simplicity. In practice, environment 100 may include more devices, fewer devices, different devices, and/or differently arranged devices than those illustrated in FIG. 1A. By way of example, network operator network 140 may include various network devices (e.g., gateways, switches, servers, routers, proxies, etc.) that are not illustrated. Additionally, OpenID service provider network 120 may include network devices other than OpenID server 125. Further, it will be appreciated that OpenID services may be implemented on a network device other than a server and/or may involve multiple network devices not specifically illustrated and described. Additionally, third party service provider network 130 may include network devices other than AS 135. Further, it will be appreciated that services, functions, assets, etc., may be implemented on a network device other than an application server and/or may involve multiple network devices not specifically illustrated and described. Also, some functions described as being performed by a particular device may be performed by a different device or a combination of devices. Environment 100 may include wired and/or wireless connections among the devices illustrated.

End device 105 may include a device having the capability to communicate with other devices, systems, networks, and/or the like. By way of example, but not limited thereto, end device 105 may include a wireless telephone (e.g., a cellular telephone, etc.), a computer (e.g., a laptop, a desktop, a palmtop, etc.), a personal digital assistant (PDA), a personal communication system (PCS) terminal, a pervasive computing device, a Web-access device, an IP set-top box and television, and/or some other type of portable device, mobile device, handheld device, stationary device, and/or vehicle-based device.

Network 115 may include one or more networks of a variety of types. By way of example, but not limited thereto, network 115 may include a public network, a private network, a local area network (LAN), a wide area network (WAN), a telephone network, such as a Public Switched Telephone Network (PSTN) or a Public Land Mobile Network (PLMN), a data network, an IP Multimedia Subsystem (IMS) network, a Voice-Over IP (VOIP) network, a packet network, the Internet, an intranet, and/or some other type of wired network and/or wireless network, or combination thereof.

OpenID service provider network 120 may include one or more network devices (e.g., OpenID server 125, databases, etc.) to provide OpenID services. OpenID services may allow user 110 to access various web sites without having to create usernames, passwords, etc., for each web site.

Third party service provider network 130 may include one or more network devices (e.g., AS 135, a repository, a server, etc.) that provides a service, an asset, an application, etc. to users. By way of example, but not limited thereto, AS 135 may correspond to a web server.

Network operator network 140 may correspond to a network that provides wired and/or wireless network access and services to users.

FIGS. 1B-1G are diagrams illustrating exemplary operations according to an exemplary embodiment of the authentication and authorization scheme. FIGS. 2A-2C are diagrams illustrating exemplary messages that may be implemented according to the exemplary embodiment of the authentication and authorization scheme.

Figure 1B:
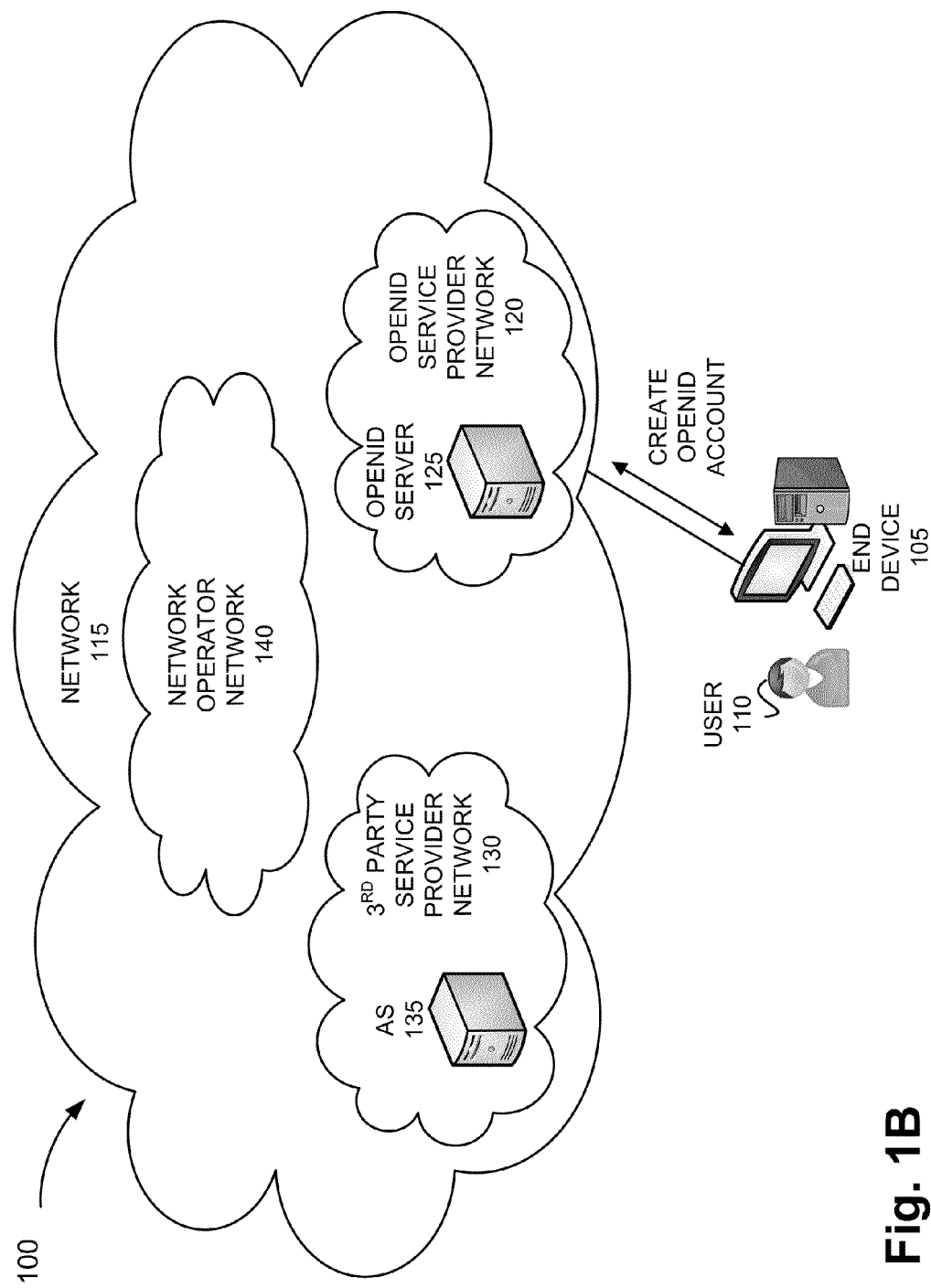
FIGS. 1B-1G are diagrams illustrating exemplary operations according to an exemplary embodiment of the authentication and authorization scheme.
Figure 2A:
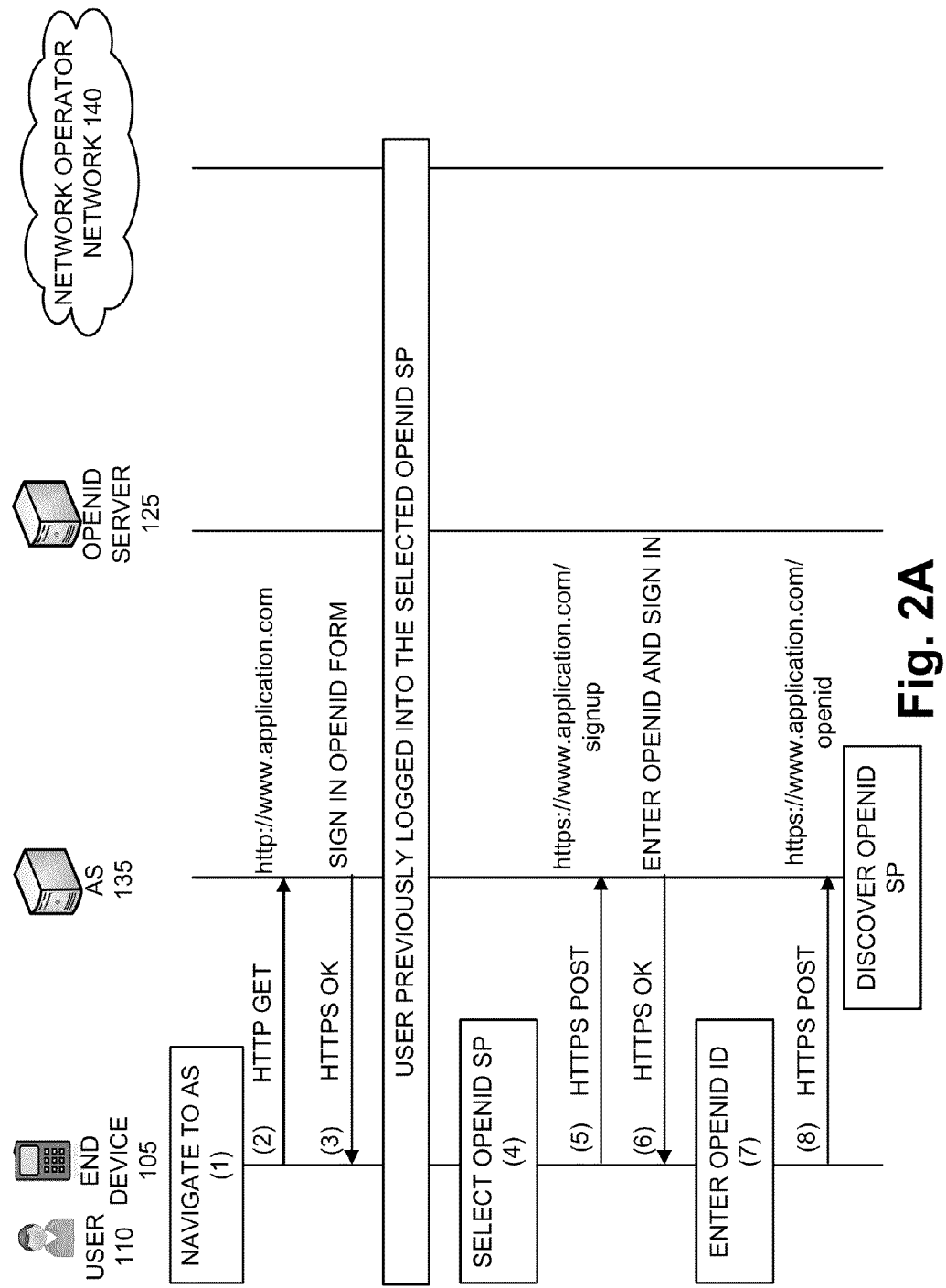
FIGS. 2A-2C are diagrams illustrating exemplary messages that may be implemented according to the exemplary embodiment of the authentication and authorization scheme.
Figure 2B:
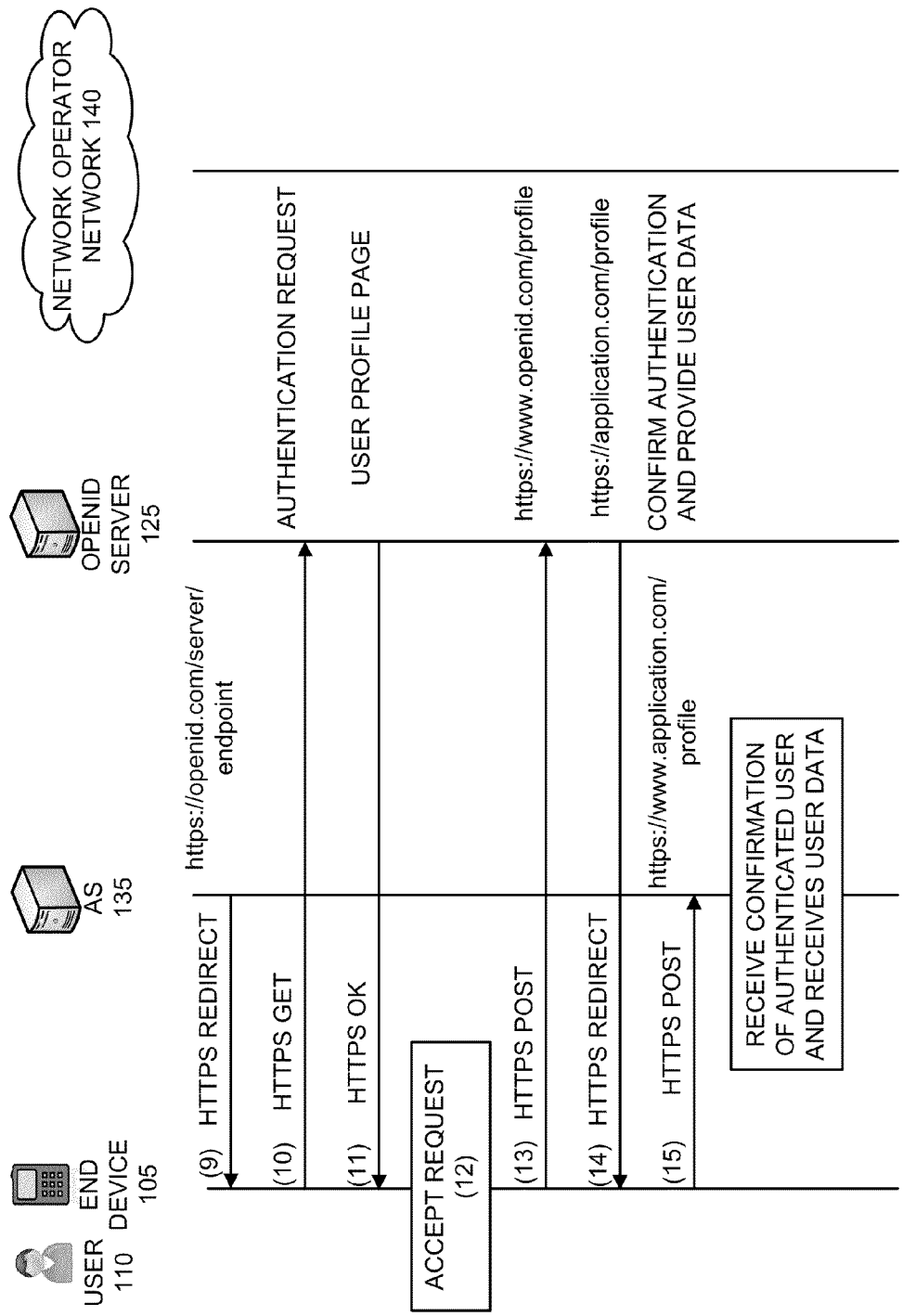
Figure 2C:
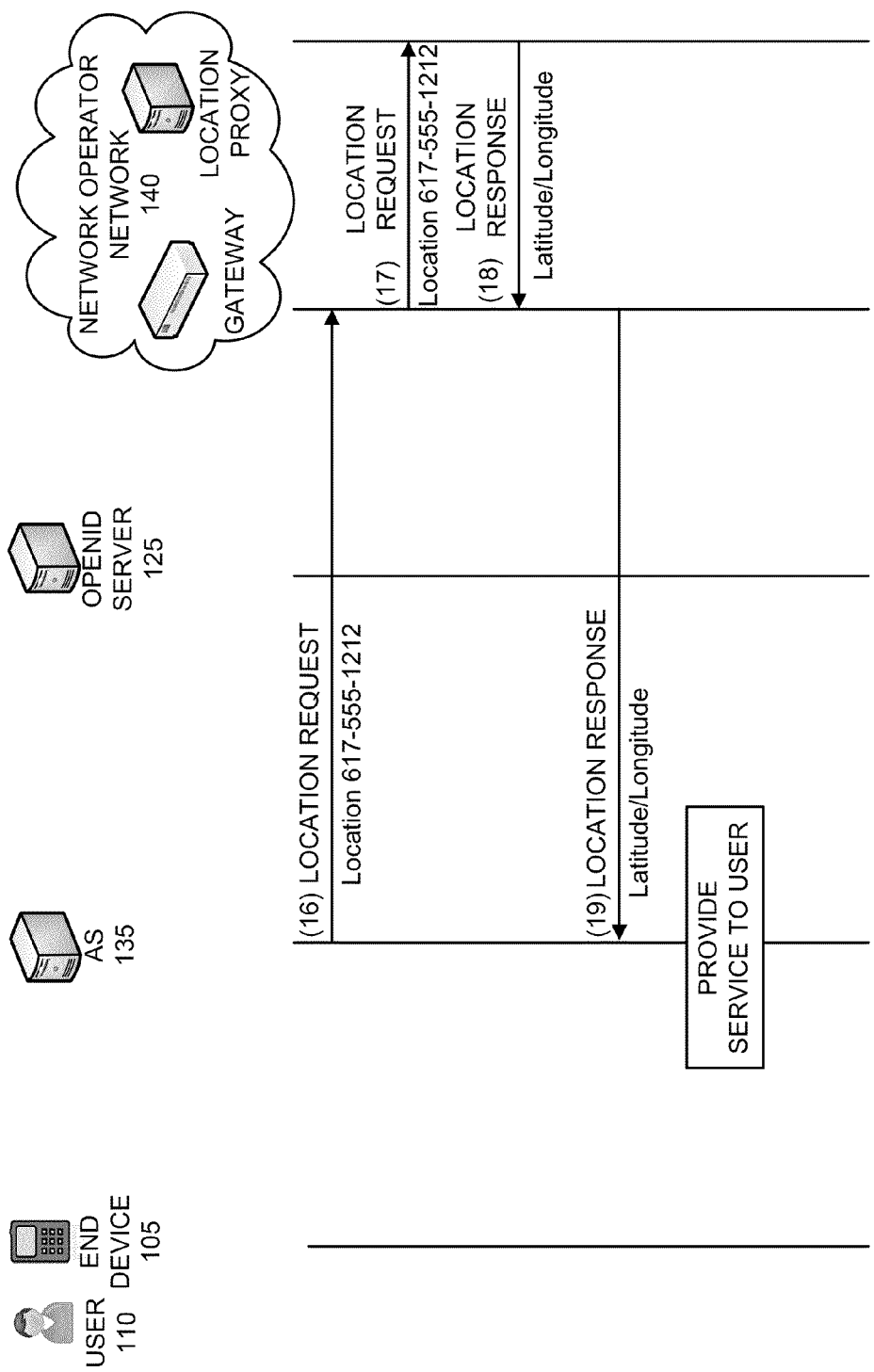

Referring to FIG. 1B, user 110 may create an OpenID account with OpenID service provider network 120. By way of example, user 110 may create his/her credentials (e.g., a user name and a password). OpenID server 125 may create an OpenID identifier. According to an exemplary implementation, the OpenID identifier may be used by user 110 during a sign-in to, for example, access a service, an asset, etc., that supports OpenID services. By way of example, but not limited thereto, the OpenID identifier may include user's 110 name and an OpenID service provider network 120 domain name. In other implementations, OpenID identifier may include different types of information. During the creation of the OpenID account, OpenID server 125 may obtain user data from user 110. By way of example, but not limited thereto, the user data may include the name, the address, the birth date, the gender, the mobile phone number, and the e-mail address associated with the user. Once the OpenID account is created, the OpenID account may permit user 110 to transfer his/her identity to various web sites.

Figure 1C:
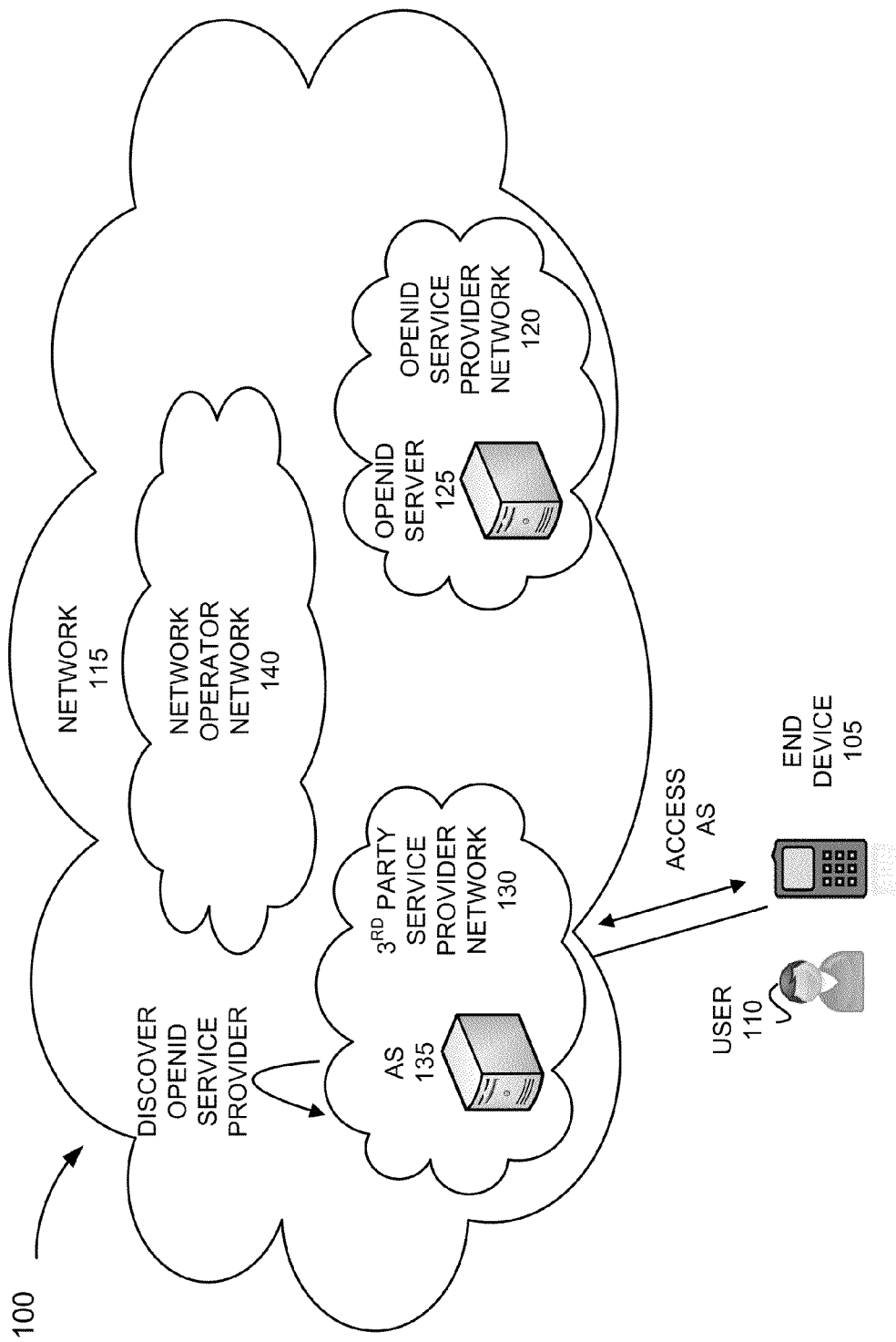

As further provided by an exemplary embodiment of the authentication and authorization scheme, user 110 may access a web site hosted on AS 135, as illustrated in FIG. 1C and illustrated by steps (1) and (2) of FIG. 2A. It may be assumed that AS 135 requires network resources from network operator network 140 in order to provide its services to user 110. According to step (3) of FIG. 2A, user 110 may navigate to an OpenID sign-in form, which may be displayed to user 110 via end device 105. The connection between end device 105 and AS 135 may be a secure connection (e.g., a Secure Sockets Layer (SSL) connection).

According to an exemplary embodiment, it may be assumed that user 110 has previously logged into OpenID server 125 and has been successfully authenticated, as illustrated in FIG. 2A. It may be further assumed that during the previous log-in, a cookie was stored on end device 105. According to an exemplary implementation, OpenID service provider network 120 may recognize that user 110 has been successfully authenticated with OpenID service provider network 120 (e.g., with OpenID server 125) based on the stored cookie.

Figure 3A:
Figure 3B:
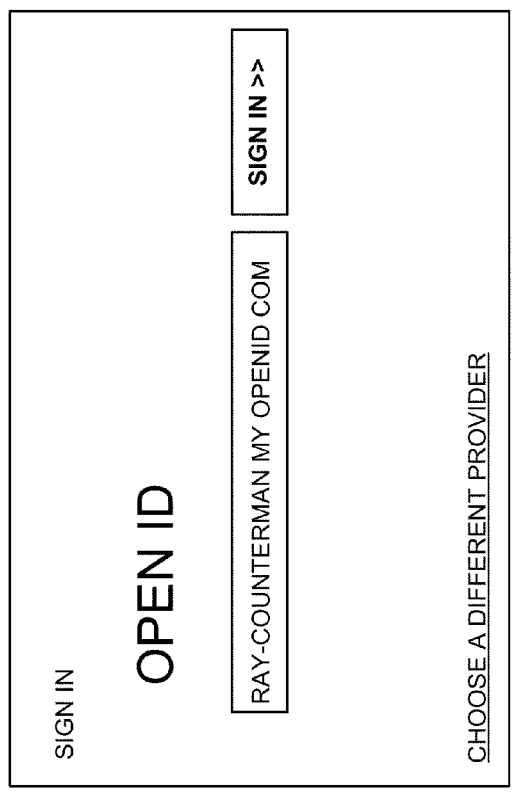

In steps (4)-(7) of FIG. 2A, user 110 may sign in. By way of example, end device 105 may display an OpenID service provider selector page, as illustrated in FIG. 3A, and user 110 may select an OpenID service provider, as illustrated in step (4) of FIG. 2A. The OpenID service provider may correspond to the OpenID service provider associated with OpenID service provider network 120 to which user 110 previously logged-in, as described above. In correspondence to steps (5)-(7) of FIG. 2A, end device 105 may display an OpenID sign-in form and user 110 may enter his/her OpenID identifier, as illustrated in FIG. 3B. The OpenID identifier may be sent to AS 135, as illustrated in step (8) of FIG. 2A.

When AS 135 receives the OpenID identifier, AS 135 may discover OpenID service provider network 120 (e.g., OpenID server 125) associated with user 110, as further illustrated in FIG. 1C. By way of example, but not limited thereto, AS 135 may discover OpenID service provider network 120 based on Extensible Resource Identifier (XRI) resolution, the Yadis protocol (e.g., when the OpenID identifier includes a Uniform Resource Locator (URL)), or a Hypertext Markup Language (HTML)-based discovery (e.g., when the OpenID identifier includes the OpenID service provider's domain).

Figure 1D:
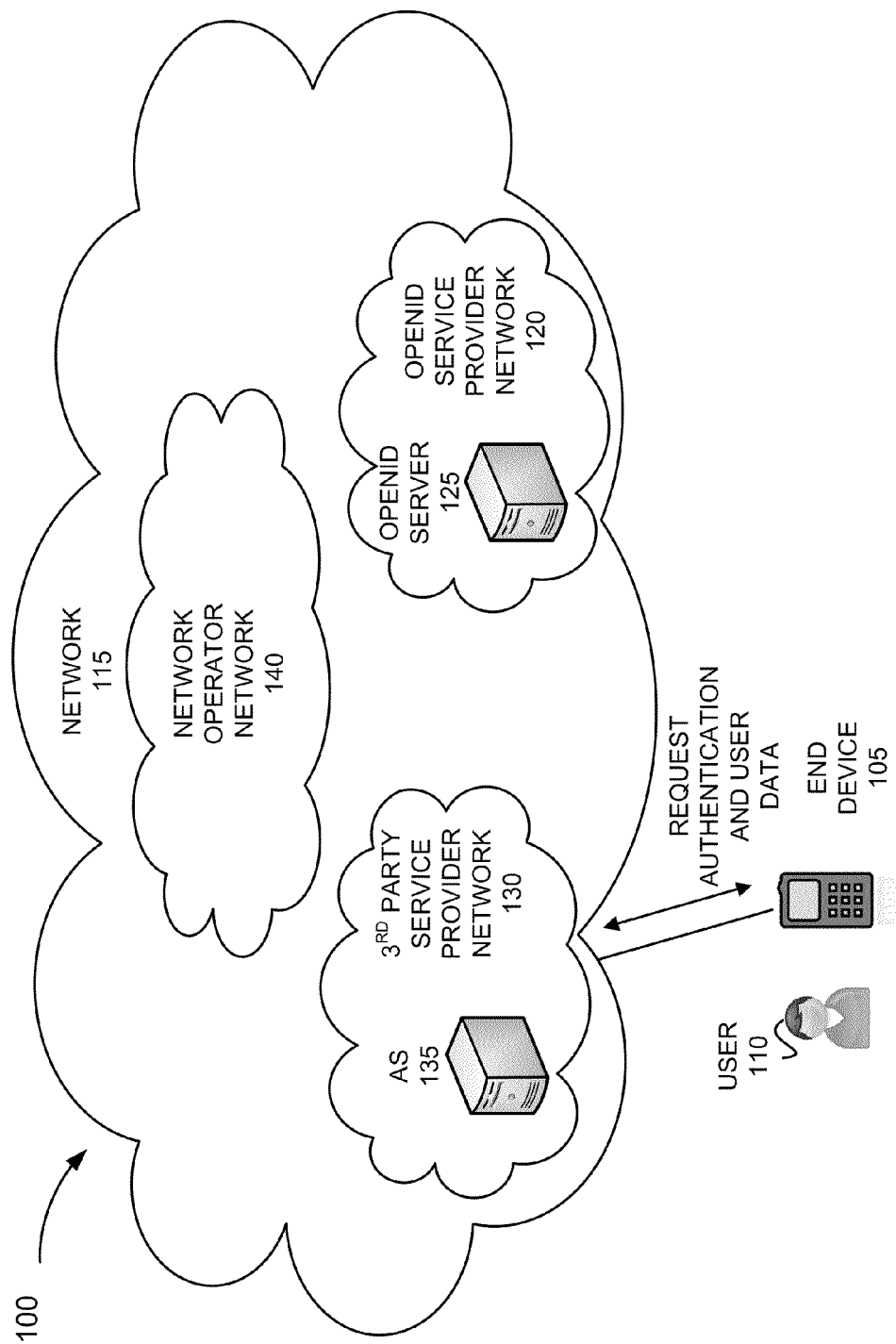

Referring to FIG. 1D, AS 135 may then request authentication from user 110 via end device 105. Additionally, AS 135 may request certain types of user data (e.g., user's 110 mobile phone number) which may be needed by AS 135 to provide user 110 with its service (e.g., to obtain user's 110 location and provide a map of user's 110 surroundings to user 110). According to an exemplary implementation, for example, as illustrated in step (9) of FIG. 2B, AS 135 may use a redirect (e.g., a Hypertext Transfer Protocol (HTTP) response having a status code 30X) to cause a browser operating on end device 105 to be redirected to a Uniform Resource Locator (URL) of OpenID server 125. As illustrated in step (10) of FIG. 2B, end device 105 may be redirected to OpenID server 125.

Figure 1E:
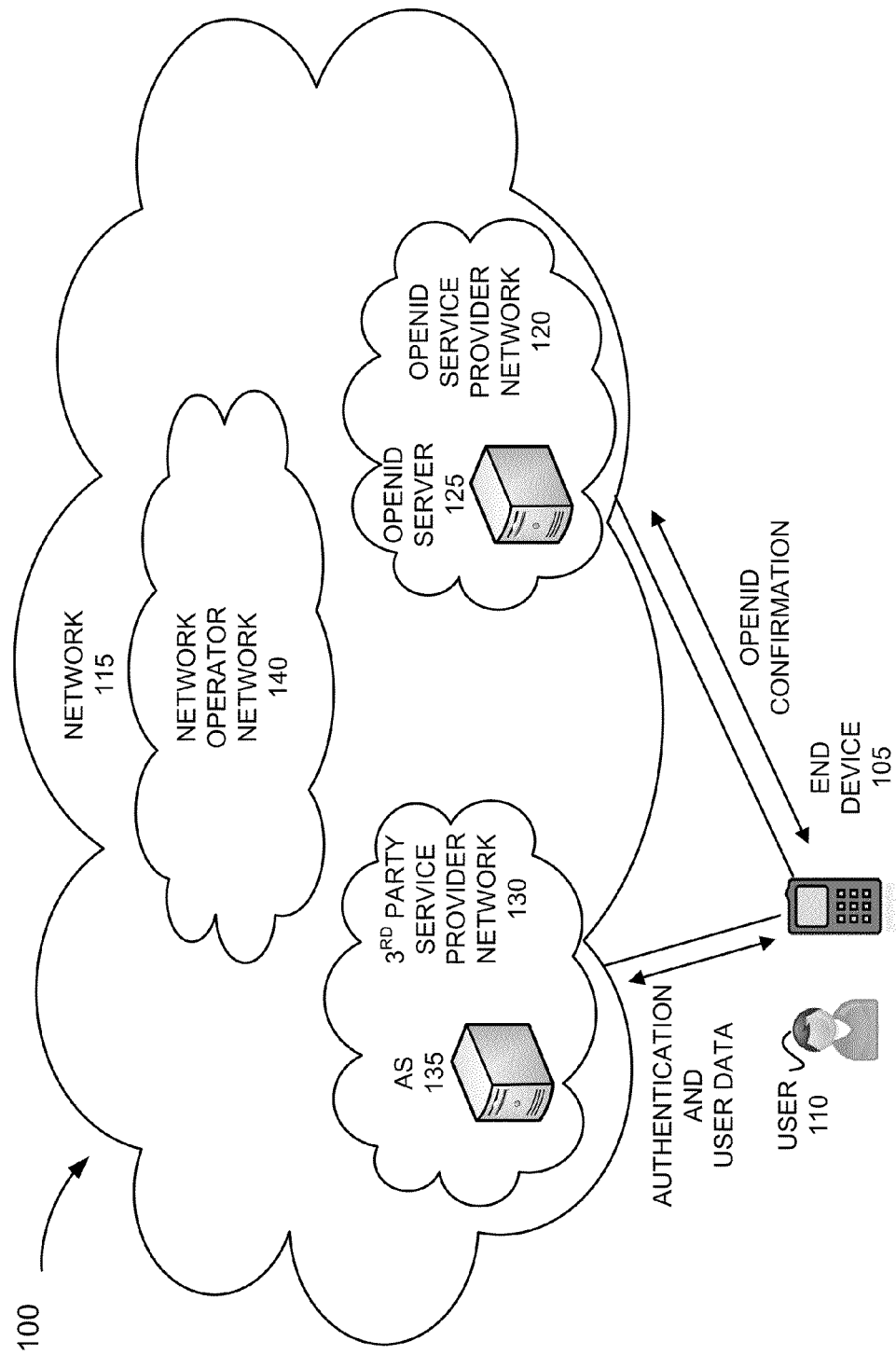

Referring to FIG. 1E, in response to the authentication/user data request from AS 135 via end device 105, OpenID server 125 may provide a web page (e.g., as illustrated in step (11) of FIG. 2B and further illustrated in FIG. 3C) to end device 105, as a part of OpenID services stemming from user's 110 previous log in, to request confirmation that user 110 wishes to access AS 135 and inform user 110 of the user data requested by AS 135. OpenID server 125 may or may not authenticate user 110 (e.g., request user's 110 OpenID identifier) before providing the web page and/or before sending user data to AS 135.

User 110 may accept or deny authentication and the release of the user data. In this example, it may be assumed that user 110 confirms authentication and release of the user data to AS 135, as illustrated in step (12) of FIG. 2B. AS 135 may be provided with authentication confirmation and the user data, as illustrated in steps (13)-(15) of FIG. 2B. According to an exemplary implementation, for example, as illustrated in step (14) of FIG. 2B, OpenID server 125 may use a redirect (e.g., an HTTP response having a status code 30X) to cause the browser operating on end device 105 to be redirected to a URL of AS 135. As illustrated in step (15) of FIG. 2B, end device 105 may be redirected to AS 135. OpenID server 125 may also indicate to AS 135 that user 110 has been authenticated and provide the requested user data. For example, the redirect message may include the indication that user 110 has been authenticated, as well as the requested user data. In this way, from the perspective of AS 135, user 110 is authenticated, the user data requested is validated and use of the user data is authorized by user 110.

In the event that AS 135 is unable to obtain the user data needed (e.g., the OpenID identity account does not include the particular user data), AS 135 may reject the sign-in of user 110. Alternatively, OpenID service provider network 120 may request the needed user data from user 110 and/or obtain user's 110 consent to authenticate with AS 135.

Figure 1F:
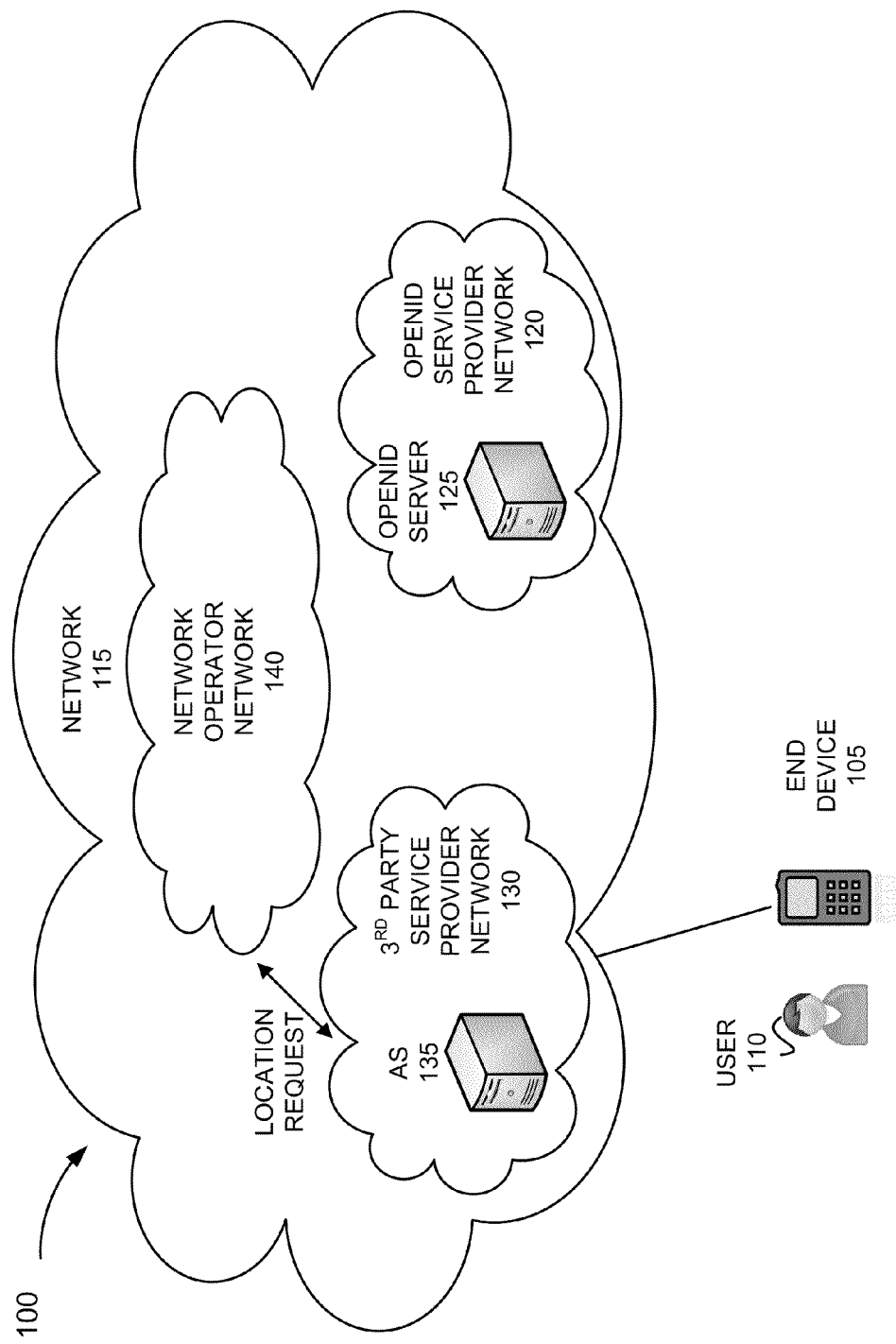

Referring to FIG. 1F, based on the authentication of user 110 and the user data (e.g., user's 110 mobile phone number) received, AS 135 may send a location request to network operator network 140. The location request may include user's 110 mobile phone number, as illustrated in step (16) of FIG. 2C. As previously described, since user 110 and the user data (e.g., user's 110 mobile phone number) have been authenticated and authorized, AS 135 may consider the identity of user 110 and the user data as valid and/or originating from a trusted source.

Upon receipt of the location request, network operator network 140 may obtain user's 110 location based on user's 110 mobile phone number. By way of example, as illustrated in steps (17) and (18) of FIG. 2C, the location request may be received by a gateway that processes the location request and sends a location request to a location proxy server, which in turn processes the location request and provides a location response to the gateway. The location response includes the location of user 110 (e.g., latitude and longitude position of user 110).

Figure 1G:
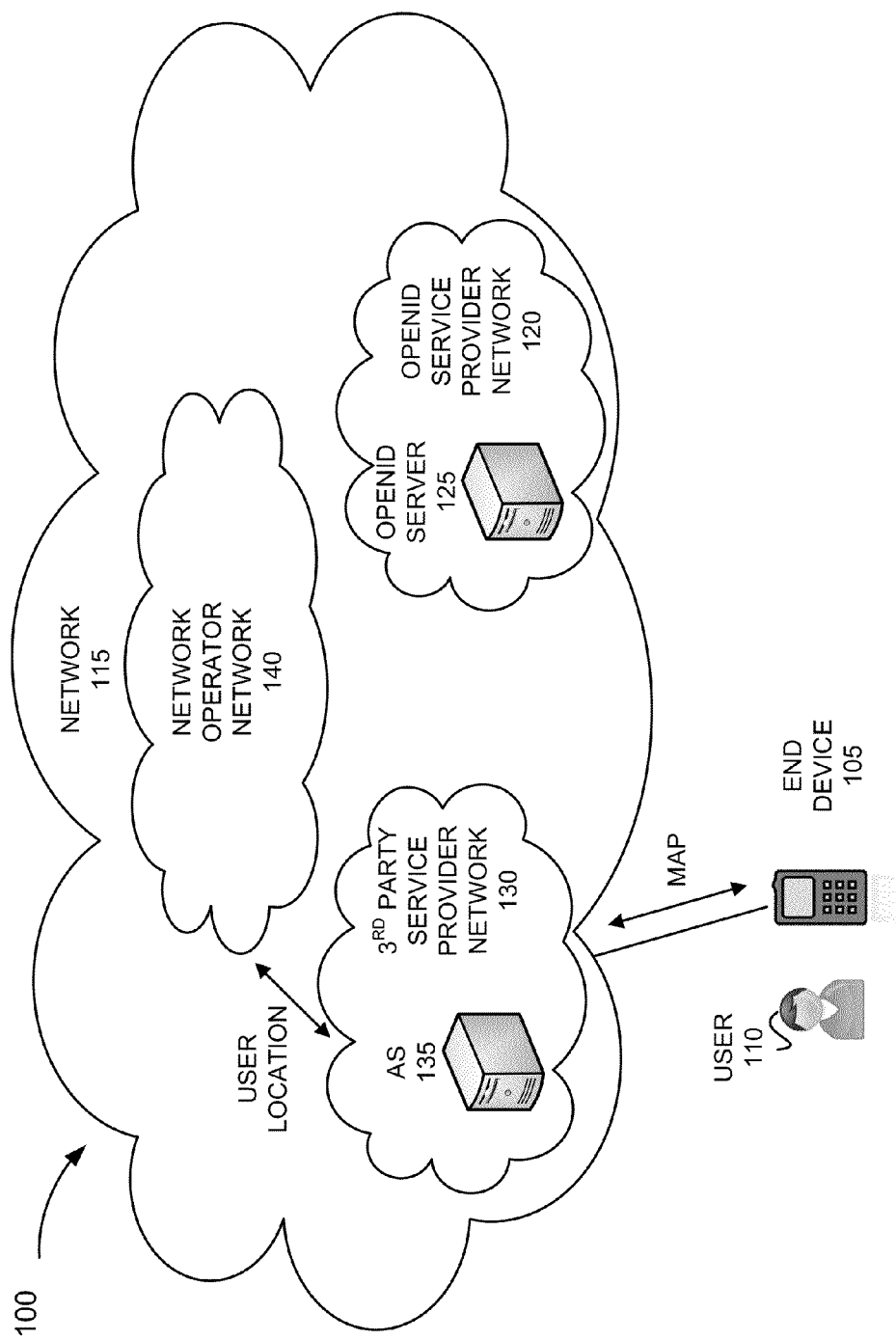

Network operator network 140 may provide user's location to AS 135, as illustrated in FIG. 1G and step (19) of FIG. 2C. According to an exemplary service provided by AS 135, AS 135 may provide a map of user's 110 current surroundings based on the location of user 110. End device 105 may display a map of user's 110 current surroundings to user 110.

Since the exemplary embodiment has been broadly described, a more detailed description is provided below. It will be appreciated that in other exemplary embodiments, AS 135 may provide a service, etc., different from that described above. By way of example, but not limited thereto, AS 135 may obtain a buddy list associated with user 110 from network operator network 140 to send a message (e.g., a Short Message Service (SMS) message, a Multimedia Messaging Service (MMS) message, an e-mail, etc.) to user's 110 buddies on behalf of user 110. Alternatively, AS 135 may send a message to user 110 via network operator network 140 regarding a sale, an advertisement, a coupon, etc. Alternatively, AS 135 may call user 110 so as to play a particular message. It will be appreciated that other third party services, assets, functions, etc., not specifically described herein may be implemented in a similar fashion.

FIG. 4 is a diagram illustrating exemplary components of a device 400 that may correspond to one or more of the devices in environment 100. For example, device 400 may correspond to end device 105, OpenID server 125, and/or AS 135. As illustrated, device 400 may include a processing system 405, memory/storage 410 including applications 415, and a communication interface 420. In other implementations, device 400 may include fewer components, additional components, different components, and/or a different arrangement of components than those illustrated in FIG. 4 and described herein.

Processing system 405 may include one or more components that may interpret and/or execute instructions and/or data. By way of example, but not limited thereto, processing system 405 may include a processor, a microprocessor, a data processor, a co-processor, an application specific integrated circuit (ASIC), a controller, a programmable logic device, a chipset, and/or a field programmable gate array (FPGA). Processing system 405 may control the overall operation or a portion of operation(s) associated with device 400. Processing system 405 may perform one or more operations based on an operating system and/or an application (e.g., applications 415).

Memory/storage 410 may include one or more memories and/or one or more secondary storages. By way of example, but not limited thereto, memory/storage 410 may include a random access memory (RAM), a dynamic random access memory (DRAM), a read only memory (ROM), a programmable read only memory (PROM), a flash memory, and/or some other type of memory. Memory/storage 410 may include a hard disk (e.g., a magnetic disk, an optical disk, a magneto-optic disk, a solid state disk, etc.) or some other type of computer-readable medium, along with a corresponding drive. Memory/storage 410 may include a memory, a storage device, or storage component that is external to and/or removable from device 400, such as, for example, a Universal Serial Bus (USB) memory stick, a hard disk, mass storage, off-line storage, etc.

The term "computer-readable medium," as used herein, is intended to be broadly interpreted to include, for example, a memory, a storage device (e.g., a hard disk and corresponding drive), a compact disc (CD), a digital versatile disc (DVD), or the like. The computer-readable medium may be implemented in relation to a single device or multiple devices, in a centralized manner, or in a distributed manner. Memory/storage 410 may store data, application(s), and/or instructions related to the operation of device 400.

Applications 415 may include software that provides a service or a function. By way of example, but not limited thereto, with reference to end device 105, applications 415 may include an e-mail application, a telephone application, a VOIP application, a camera application, a multi-media application, a visual voicemail application, a contacts application, a data organizer application, an instant messaging application, a texting application, a web browsing application, etc. By way of example, but not limited thereto, with reference to OpenID server 125, applications 415 may include an OpenID service application. By way of example, but not limited thereto, with reference to AS 135, applications 415 may include an application that provides a service, an asset, information, and/or some function.

Communication interface 420 may permit device 400 to communicate with other devices, networks, systems and/or the like. Communication interface 420 may include a wireless interface and/or a wired interface. Communication interface 420 may include a transceiver, a transmitter, a receiver, or the like, and may be operate according to one or more protocols, standards, or the like.

Device 400 may perform one or more operations and/or processes in response to processing system 405 executing software instructions contained in a computer-readable medium, such as memory/storage 410. By way of example, but not limited thereto, the software instructions may be read into memory/storage 410 from another computer-readable medium or from another device via communication interface 420. The software instructions contained in memory/storage 410 may cause processing system 405 to operations or processes described herein. Alternatively, device 400 may perform one or more operations and/or processes in response to logic executed by processing system 405. Thus, exemplary implementations described herein are not limited to any specific combination of hardware and software, hardware, hardware and firmware, etc.

Figure 5A:
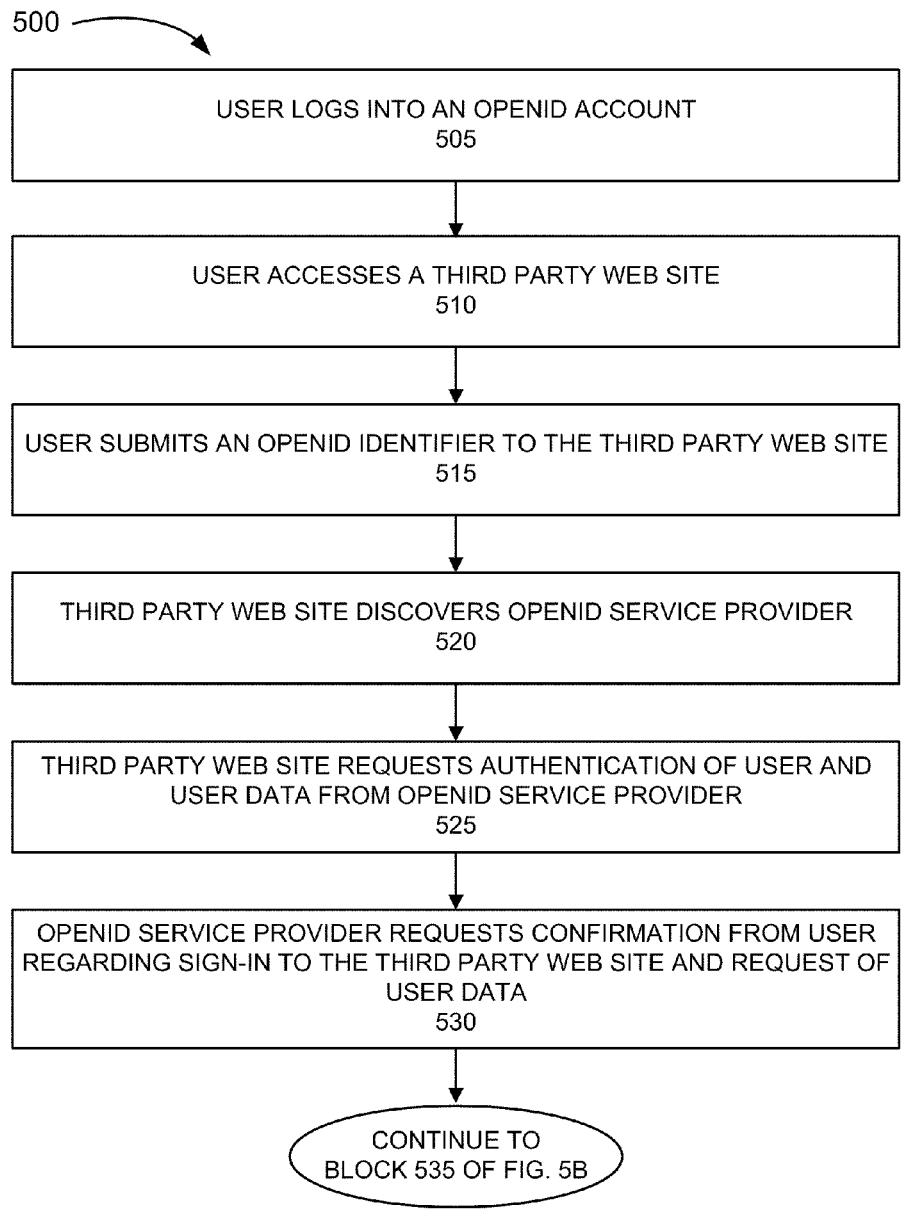
FIGS. 5A and 5B are flow diagrams illustrating an exemplary process that allows a network operator network device to obtain authentication of a user and authorization from the user to release user data to a third party service provider network device based on OpenID services.
Figure 5B:
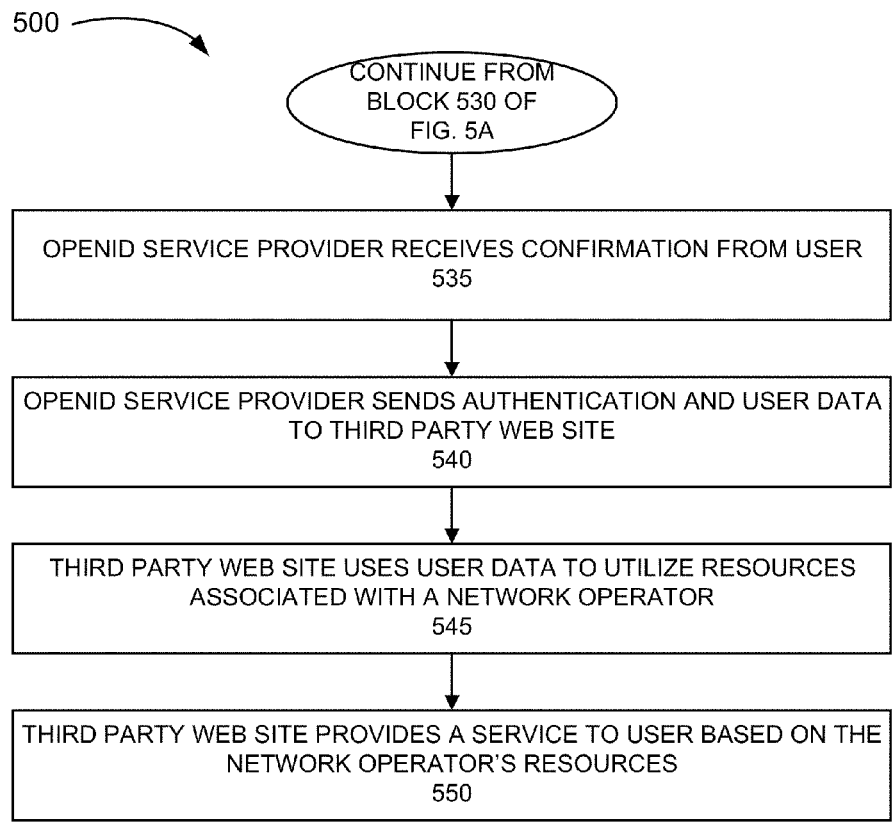

FIGS. 5A and 5B are flow diagrams illustrating an exemplary process that allows a network operator network device to obtain authentication of a user and authorization from the user to release user data to a third party service provider network device based on OpenID services.

Process 500 may include a user logging into an OpenID account (block 505). By way of example, but not limited thereto, end device 105 may communicate with an OpenID network device (e.g., OpenID server 125 of OpenID service provider network 120). OpenID server 125 may provide an interface (e.g., a web-based graphical user interface (GUI)) with which user 110, via end device 105, may log into an OpenID account. User 110 may provide, via end device 105, an OpenID identifier. According to an exemplary implementation, OpenID server 125 may store a cookie on end device 105, as previously described.

The user may access a third party web site (block 510). By way of example, but not limited thereto, end device 105 may communicate with a third party service provider network device (e.g., AS 135 of third party service provider network 130). According to an exemplary implementation, AS 135 may recognize that user 110 has been successfully authenticated with OpenID server 125 based on the stored cookie. AS 135 may provide an interface (e.g., a web-based GUI) to allow user 110 to select an OpenID service provider. User 110 may select the OpenID service provider, via end device 105, with which user 110 previously logged on. AS 135 may provide an OpenID sign-in form to user 110 via end device 105.

The user may submit an OpenID identifier to the third party web site (block 515). By way of example, but not limited thereto, user 110 may provide AS 135 with his/her OpenID identifier via end device 105. In other implementations, user 110 may provide additional credentials.

The third party web site may discover the OpenID service provider (block 520). By way of example, but not limited thereto, AS 135 may discover OpenID server 125 based on XRI resolution, the Yadis protocol, an HTML discovery, or some other type of discovery method, as previously described.

The third party web site may request authentication of user and user data from the OpenID service provider (block 525). By way of example, but not limited thereto, AS 135 may use a redirect (e.g., an HTTP response having a status code 30X) to cause a browser operating on end device 105 to be redirected to a URL of OpenID server 125. AS 135 may request authentication of user and user data. According to an exemplary case previously described, the user data may correspond to the user's mobile phone number. However, in other exemplary cases, the user data may correspond to other types of user data (e.g., the user's email address, etc.).

The OpenID service provider may request confirmation from the user regarding signing-in to the third party web site and the request of user data (block 530). By way of example, but not limited thereto, OpenID server 125 may send a web page to end device 105 to request confirmation that user 110 wishes to access AS 135 and inform user 110 of the user data requested by AS 135. According to an exemplary implementation, AS 135 may re-authenticate user 110 (e.g., request user 110 provide his/her OpenID identifier) before providing the web page to user 110. In other exemplary implementations, AS 135 may rely on the previous log-in for authentication purposes.

The OpenID service provider may receive confirmation from the user (block 535). User 110 may confirm or deny his/her intention to access AS 135 and/or the use of the user data requested by AS 135. For purposes of description, it may be assumed that user 110 confirms authentication and use of the user data via end device 105.

The OpenID service provider sends authentication of user and user data to the third party web site (block 540). By way of example, but not limited thereto, OpenID server 125 may use a redirect (e.g., an HTTP response having a status code 30X) to cause the browser operating on end device 105 to be redirected to a URL of AS 135. OpenID server 125 may also indicate to AS 135 that user 110 has been authenticated and provide the requested user data.

The third party web site may use the user data to utilize resources associated with a network operator (block 545). By way of example, but not limited thereto, AS 135 may send a request to network operator network 140 for a network operator service based on the received user data. By way of example, but not limited thereto, AS 135 may send a location request or a buddy list request. For example, the location request may include user's 110 mobile phone number and the buddy list request may include user's 110 e-mail address.

The third party web site may provide a service to the user based on the network operator's resources (block 550). By way of example, but not limited thereto, AS 135 may provide a service to user 110, such as, sending a message to user 110, calling user 110, providing a map of user's 110 current surroundings to user 110, etc.

Although FIGS. 5A and 5B illustrate process 500 as including operations described above, in other implementations, process 500 may include additional operations, fewer operations, and/or different operations than those illustrated in FIGS. 5A and 5B and described above.

As previously described, user 110 may create an OpenID account with OpenID service provider network 120 to obtain OpenID services. However, the process of creating the OpenID account may be burdensome to user 110 because user 110 may have to enter various types of user data. This may be particularly burdensome when end device 105 is a handheld device (e.g., a mobile phone having Web access capability) that has a small keypad or the like.

Network operator network 140 may possess user data associated with user 110, as well as devices, systems, etc., to manage such user data. Additionally, from the perspective of an OpenID service provider, the user data possessed by the network operator network 140 can be considered valid and trustworthy. Accordingly, it would be beneficial if OpenID service provider network 120 could utilize the user data possessed by network operator network 140. By way of example, but not limited thereto, OpenID service provider network 120 may utilize this user data to create the OpenID account or provide OpenID services.

Unfortunately, OpenID service provider network 120 needs to obtain the correct user data associated with user 110 from network operator network 140. For example, OpenID service provider network 120 may rely on the OpenID identifier to obtain the user data from network operator network 140. However, OpenID service provider network 120 cannot assume that the identity of user 110 (e.g., corresponding to the OpenID identifier) can be used to query network operator network 140 and/or can be used to obtain the correct user data. For example, the identity of user 110 may be different between OpenID service provider network 120 and network operator network 140.

To permit the exchange of user data, the OpenID service provider and the network operator may have an agreement on the use of their user data, security of the user data, etc. In some instances, the OpenID service provider and the network operator may not be the same party. In other instances, the OpenID service provider and the network operator may be the same party in which case internal policies, etc. may govern such issues.

Figure 6A:
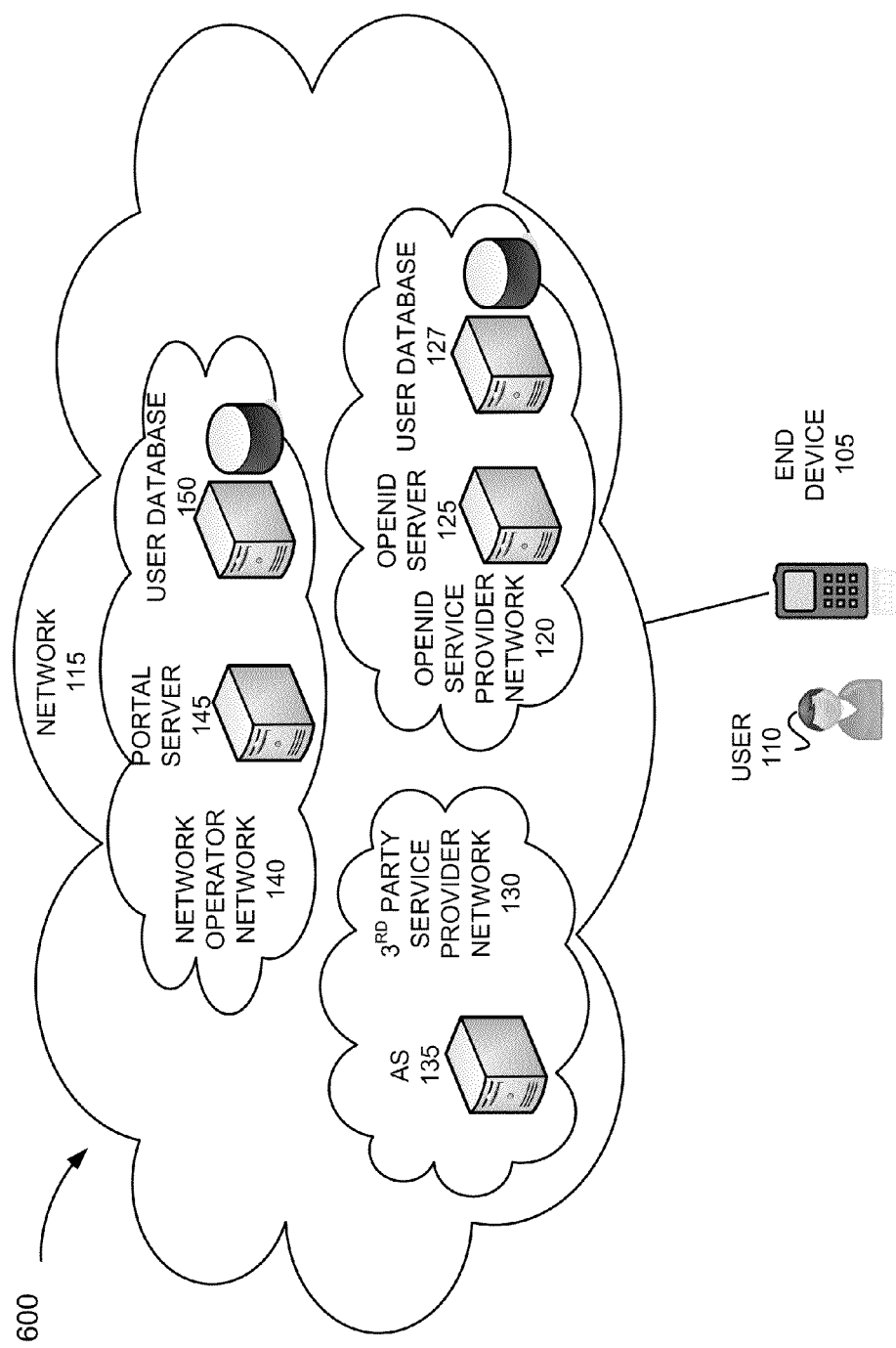
FIG. 6A is a diagram illustrating an exemplary environment in which another exemplary embodiment of the authentication and authorization scheme may be implemented.

FIG. 6A is a diagram illustrating an exemplary environment 600 in which an exemplary embodiment of the authentication and authorization scheme may be implemented. As illustrated, environment 600 may include end device 105, network 115, OpenID service provider network 120 including OpenID server 125, third party service provider network 130 including AS 135, and a network operator network 140, as previously illustrated in FIGS. 1A-1G and described. In addition, environment 600 may include OpenID service provider network 120 including a user database 127, and network operator network 140 may include a portal server 145 and a user database 150. User databases 127 and 150 may each manage and store user data. Portal server 145 may include a device capable of communicating with other devices, networks, systems, or the like. Portal server 145 may allow user 110 to access his/her network operator account.

The number of devices and configuration in environment 600 is exemplary and provided for simplicity. In practice, environment 600 may include more devices, fewer devices, different devices, and/or differently arranged devices than those illustrated in FIG. 6A. By way of example, OpenID server 125 and user database 127 may be combined as a single device. Additionally, or alternatively, network operator network 140 may include a network device (e.g., a gateway, an edge device, etc.) different from portal server 145 to provide the functionality described. Also, some functions described as being performed by a particular device may be performed by a different device or a combination of devices. Environment 600 may include wired and/or wireless connections among the devices illustrated.

FIGS. 6B-6E are diagrams illustrating exemplary operations according to an exemplary embodiment of the authentication and authorization scheme. FIGS. 7A-7C are diagrams illustrating exemplary messages that may be implemented according to the exemplary embodiment of the authentication and authorization scheme.

Figure 6B:
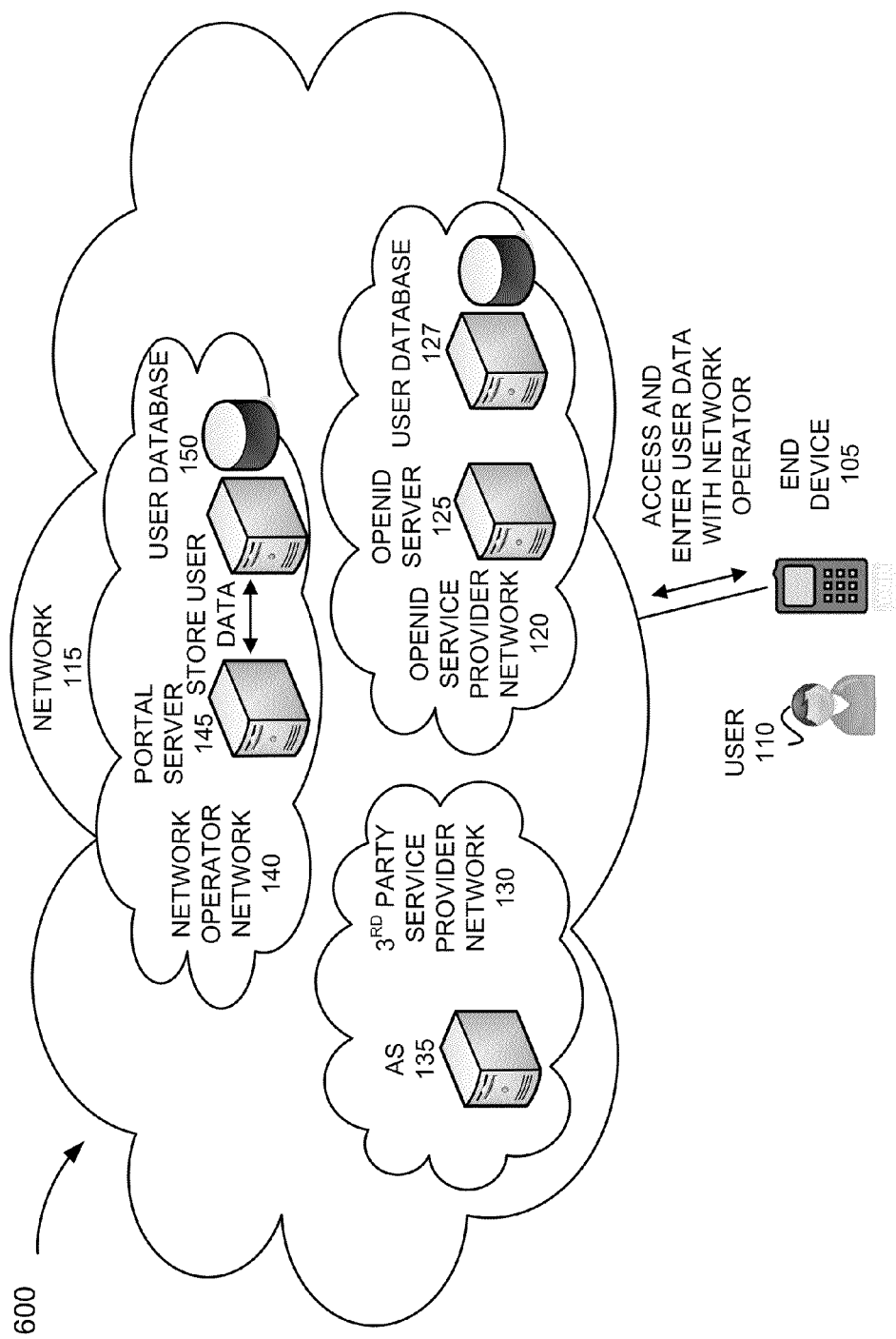
FIGS. 6B-6E are diagrams illustrating exemplary operations according to an exemplary embodiment of the authentication and authorization scheme.
Figure 7A:
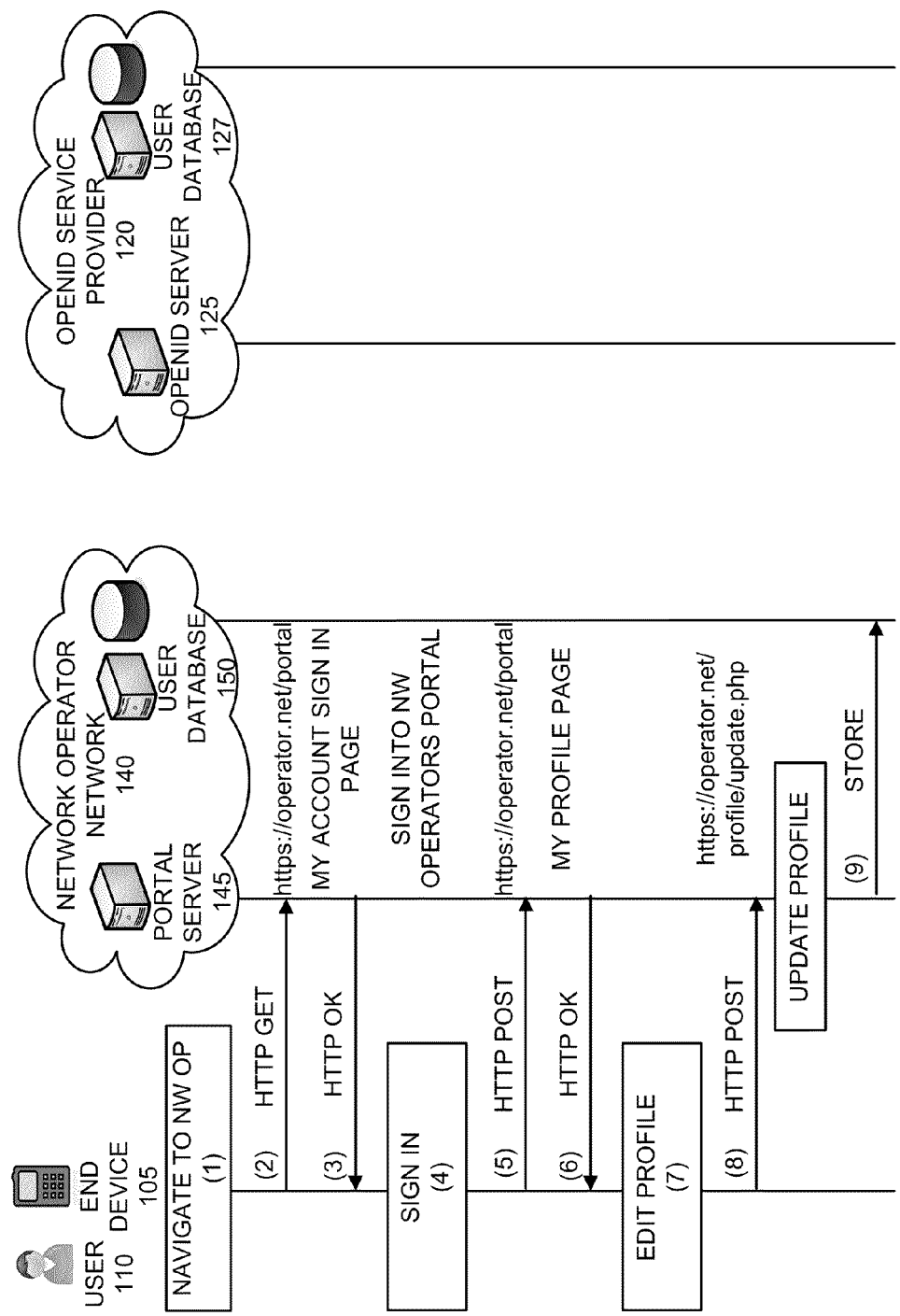
Figure 7C:
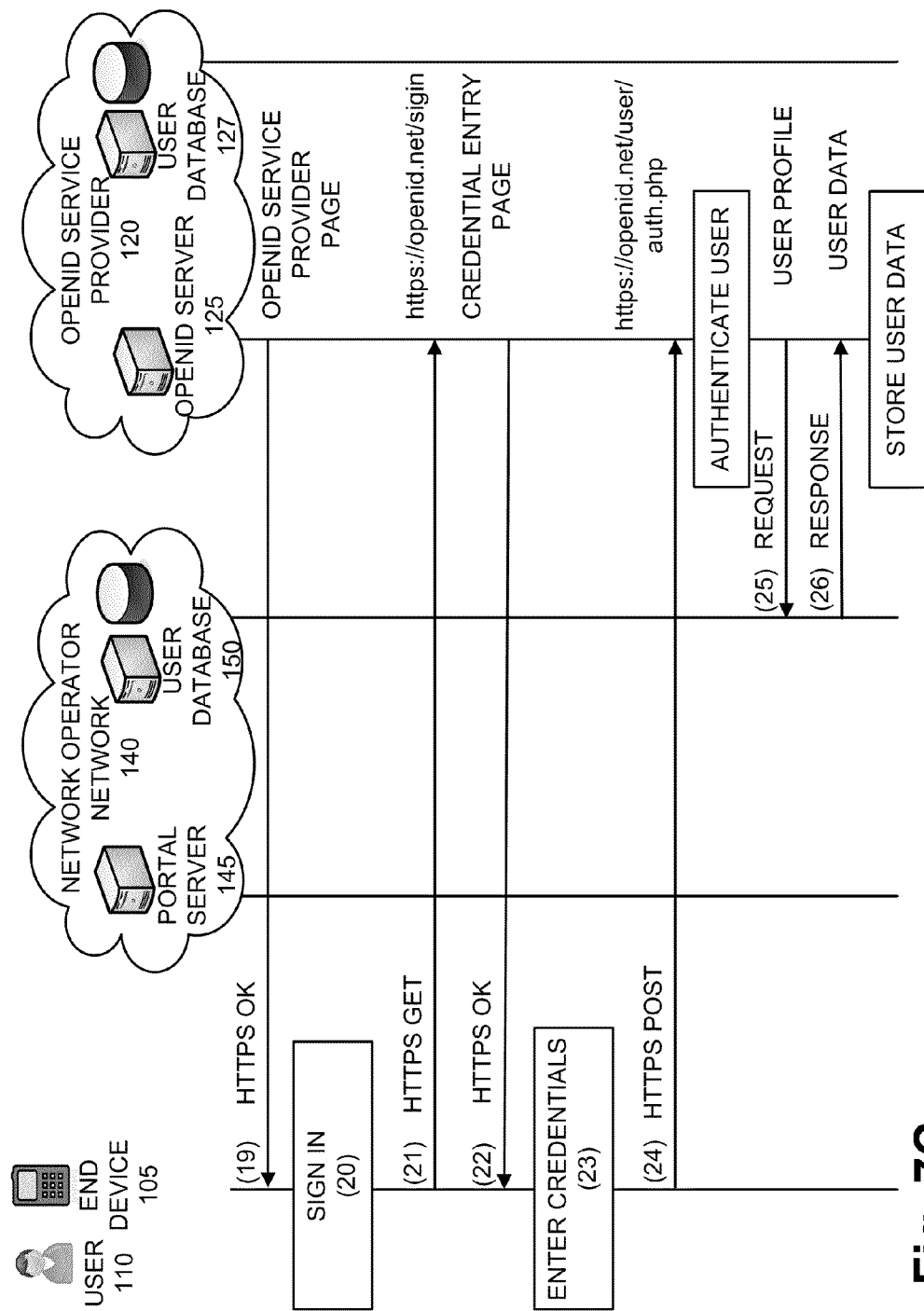

Referring to FIG. 6B, user 110 may access and enter user data to his/her network operator account. By way of example, user 110 may navigate to network operator network 140 with end device 105 and access his/her network operator account via a web portal or a web service, as illustrated by steps (1)-(3) of FIG. 7A. User 110 may be presented with a sign-in page, as illustrated in FIG. 8A. User 110 may sign in, as illustrated by step (4) of FIG. 7A. User 110 may sign in utilizing various credentials (e.g., a user name, a password, etc.), an OpenID identifier (e.g., if the sign-in page supports OpenID), and/or other types of user data (e.g., user's 110 mobile phone number, etc.) for authentication purposes. Alternatively, user 110 may contact an authorized third party (e.g., an account representative of the network operator) to manage his/her account and/or enter user data.

After signing in, user 110 may navigate to a My Profile page (e.g., as illustrated in FIG. 8B) and edit any user data, if necessary, as illustrated by steps (5)-(8) of FIG. 7A. Portal server 145 may update user data and store the update in user database 150, as illustrated by step (9) of FIG. 7A and step (10) of FIG. 7B.

Figure 6C:
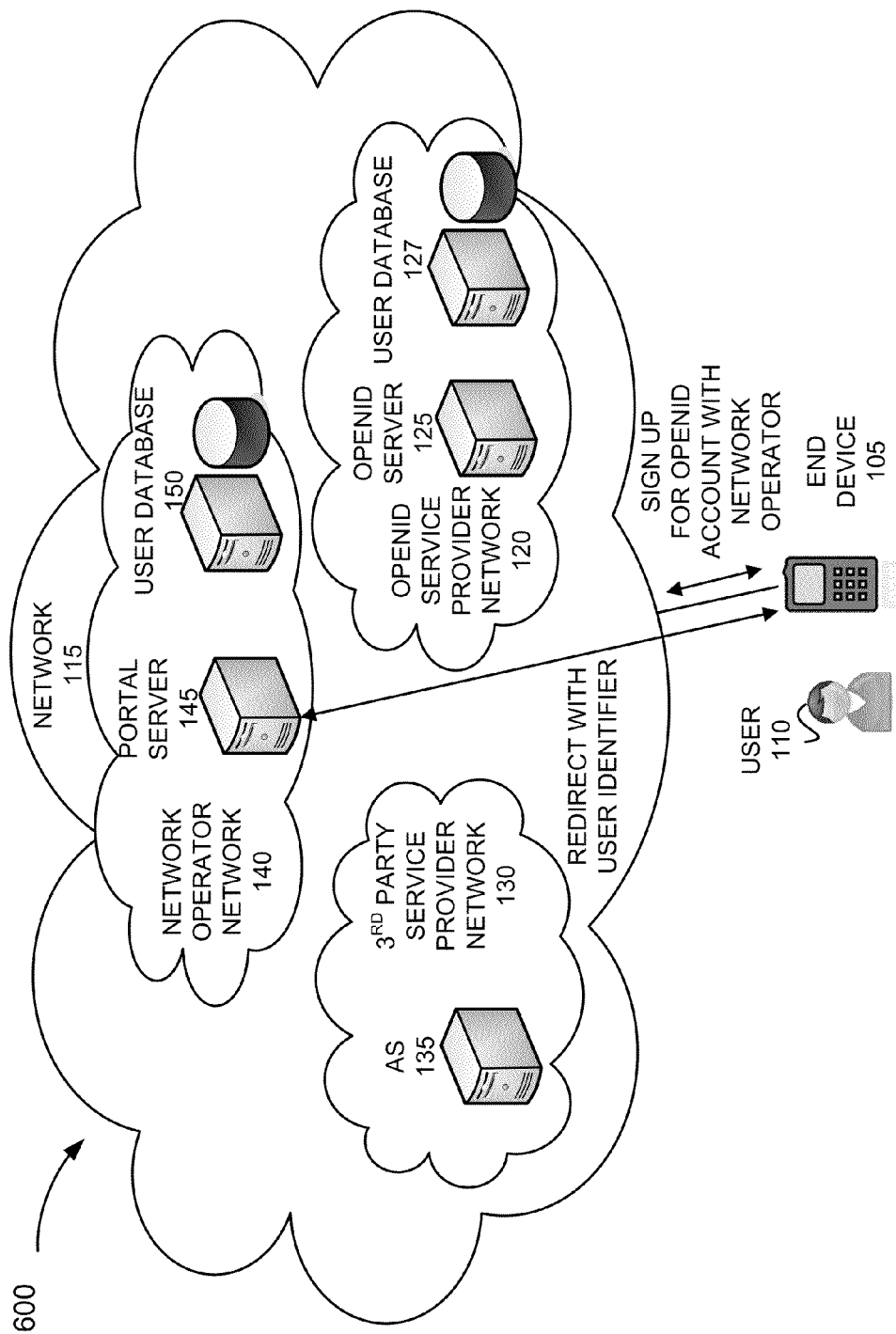
Figure 6D:
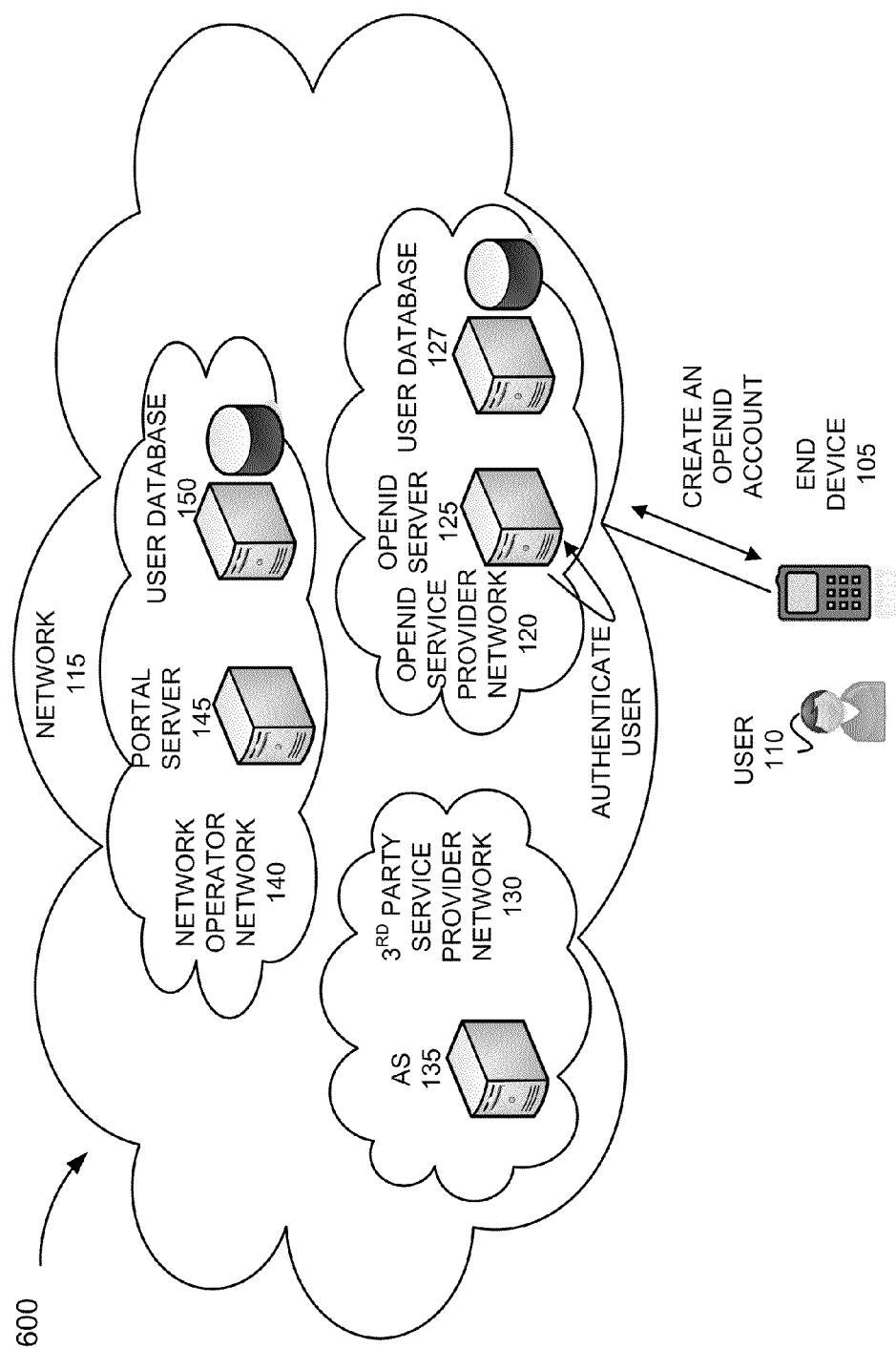

Referring to FIG. 6C, user 110 may wish to sign up for an OpenID account with the network operator. For example, the My Profile page may include an OpenID sign up button 805 to allow user 110 to sign up for an OpenID account, as illustrated in FIG. 8B. It may be assumed that user 110 desires to sign up for an OpenID account, as illustrated by steps (11)-(14) of FIG. 7B. Portal server 145 may present a page listing the OpenID service providers with which the network operator has an agreement on sharing user data. In this example, user 110 selects the network operator as their OpenID service provider and user 110 is directed to the network operator's OpenID web site and set-up page, as illustrated in steps (15)-(18) of FIG. 7B. According to an exemplary implementation, the redirect message (as illustrated by step (17)) includes a user identifier. The user identifier can be used by OpenID service provider (e.g., OpenID server 125) to access user data, which is associated with user 110 and stored in user database 150 of network operator network 140. By way of example, the redirect message may conform to the Security Assertion Markup Language (SAML) standard.

OpenID server 125 may send a web page (as illustrated by step (19) of FIG. 7C) to end device 105 that includes a sign-in button for use by users that have an existing OpenID account and a create account button for use by users that do not have an existing OpenID account. In this example, it may be assumed that user 110 does not have an existing OpenID account.

Figure 8C:
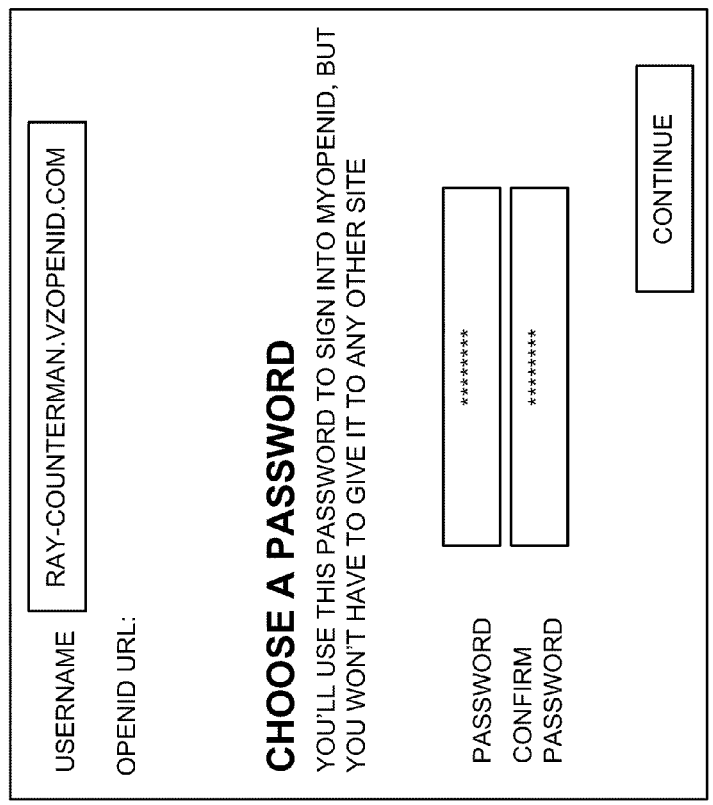

User 110 may create an OpenID account with OpenID service provider network 120, which in this example, is associated with the network operator. By way of example, user 110 may select a user name and a password. User 110 may use the same password that was used to sign in to the network operator's account or user 110 may create a new password. The password may be used to authenticate user 110 with OpenID service provider network 120. Additionally, or alternatively, OpenID service provider network 120 may utilize other methods for authenticating user 110. FIG. 8C is a diagram illustrating exemplary sign-in page, and steps (20)-(24) of FIG. 7C illustrate exemplary messaging that may occur during user's 110 sign-in. In the event user 110 already has an OpenID account with OpenID service provider network 120, user 110 may enter his/her OpenID identifier to authenticate with OpenID service provider network 120.

Referring back to FIG. 6D, OpenID service provider network 120 may authenticate user 110. By way of example, but not limited thereto, user 110 may be authenticated based on credential information (e.g., username, password, etc.), sending an e-mail or an SMS message to confirm user's 110 identity, obtaining Subscriber Identity Module (SIM) card credentials, or the like.

Figure 6E:
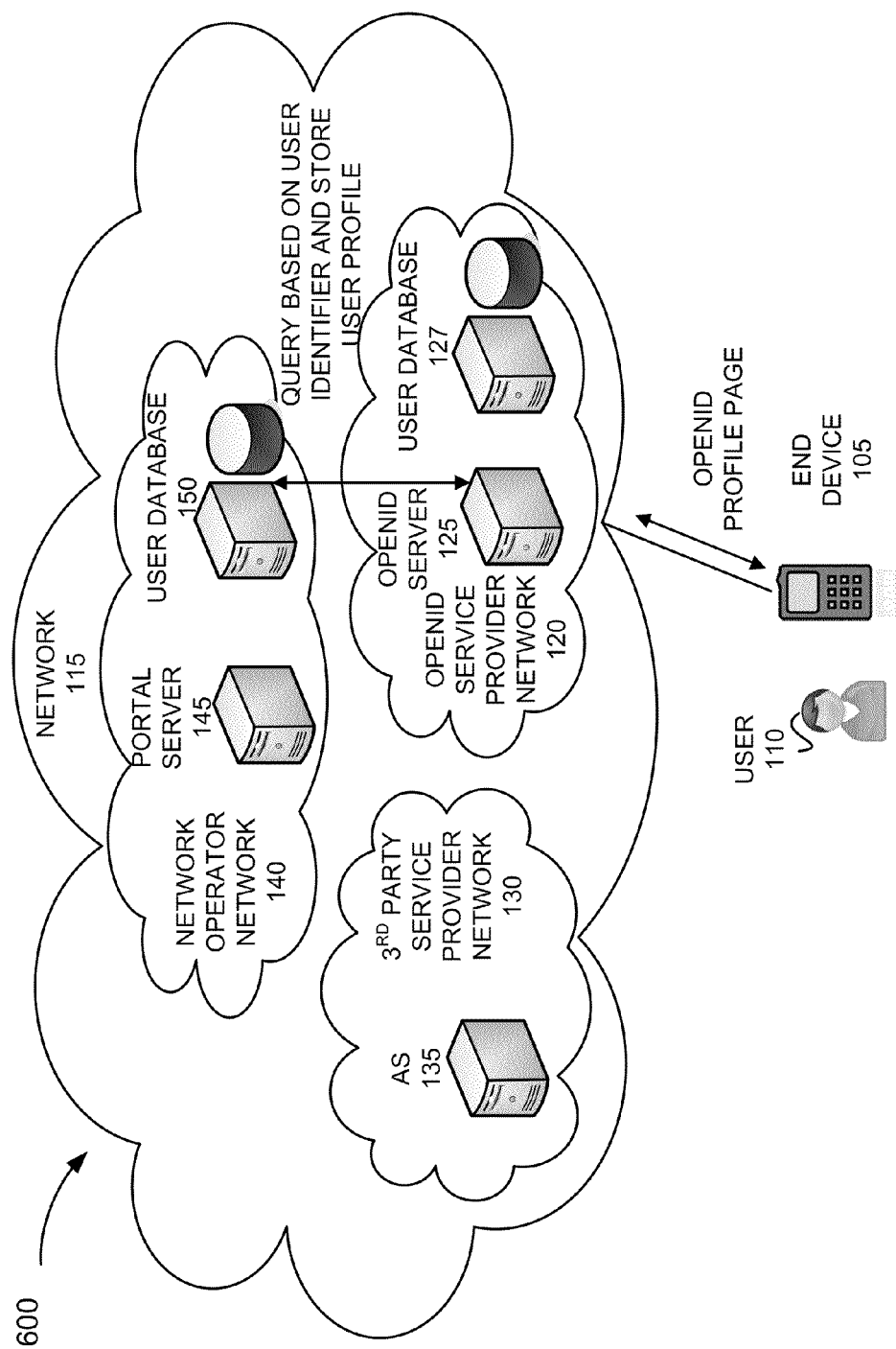
Figure 7D:
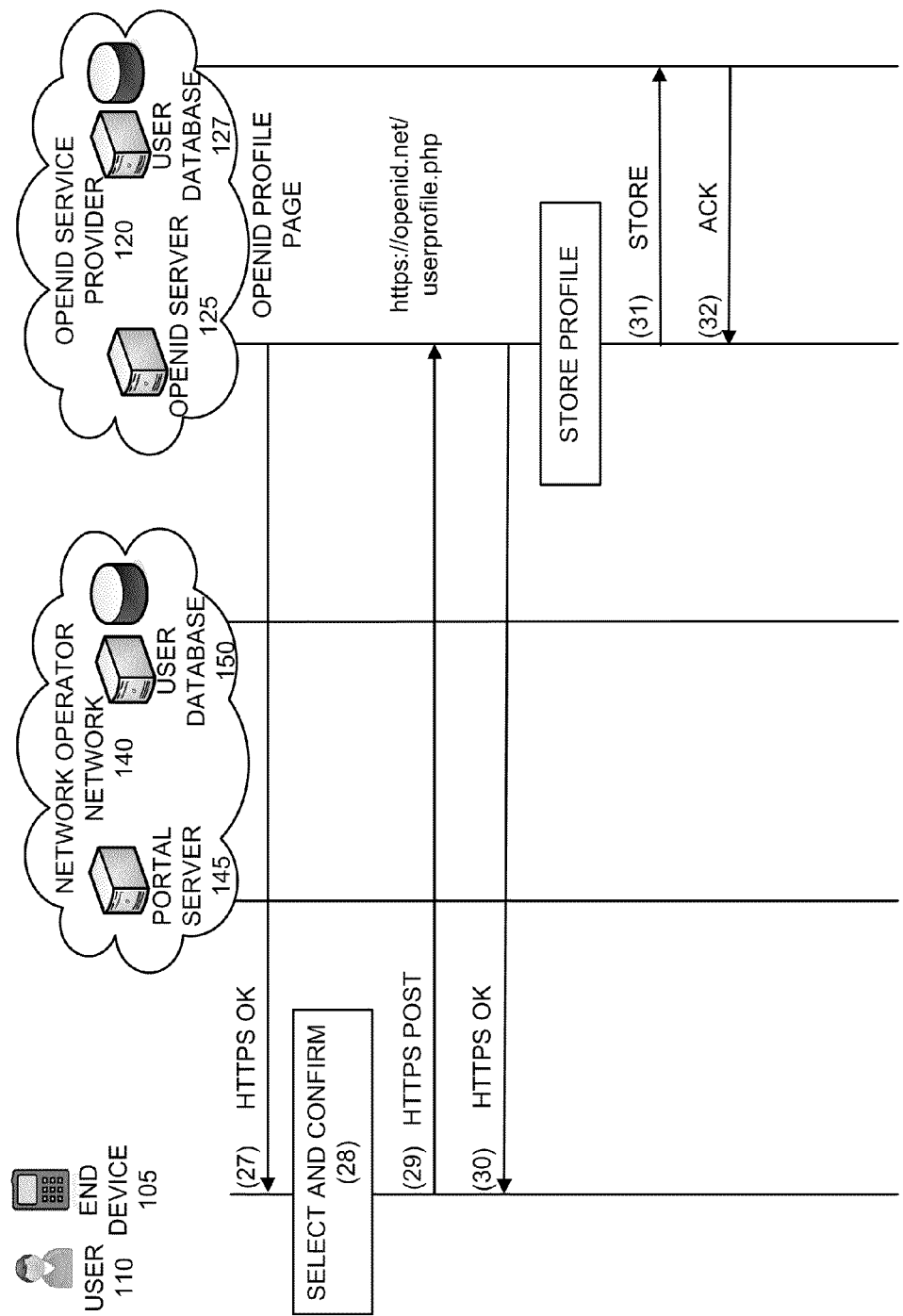

Referring to FIG. 6E and steps (25) and (26) of FIG. 7C, after authentication is successfully completed, OpenID service provider network 120 may retrieve a user profile in user database 150 of network operator network 140. According to an exemplary implementation, OpenID server 125 may utilize the user identifier, previously described, to query user database 150 of network operator network 140. According to other implementations, the network operator and the OpenID service provider may agree on some other identifier to be used to query user database 150 of network operator network 140. Once the user profile (i.e., user data) is received by OpenID server 125, OpenID server 125 may temporarily store the user data until user 110 provides consent and authorizes OpenID service provider network 120 to use the user data. By way of example, OpenID server 125 may provide a page to user 110 asking which user data user 110 wishes to store as an OpenID profile. FIG. 8D is a diagram illustrating an exemplary page with which user 110 may confirm the accuracy of the user data and authorize the use of the user data. According to this exemplary page, user 110 may select particular user data (e.g., check boxes corresponding to the selected user data) that may be utilized to create the OpenID profile. Steps (27)-(30) of FIG. 7D illustrate exemplary messaging that may occur between user 110 and OpenID server 125. In this example, user 110 may confirm and authorize the use of the user data. In response, OpenID server 125 may permanently store the OpenID profile in user database 127, completing the OpenID account setup.

Figure 9A:
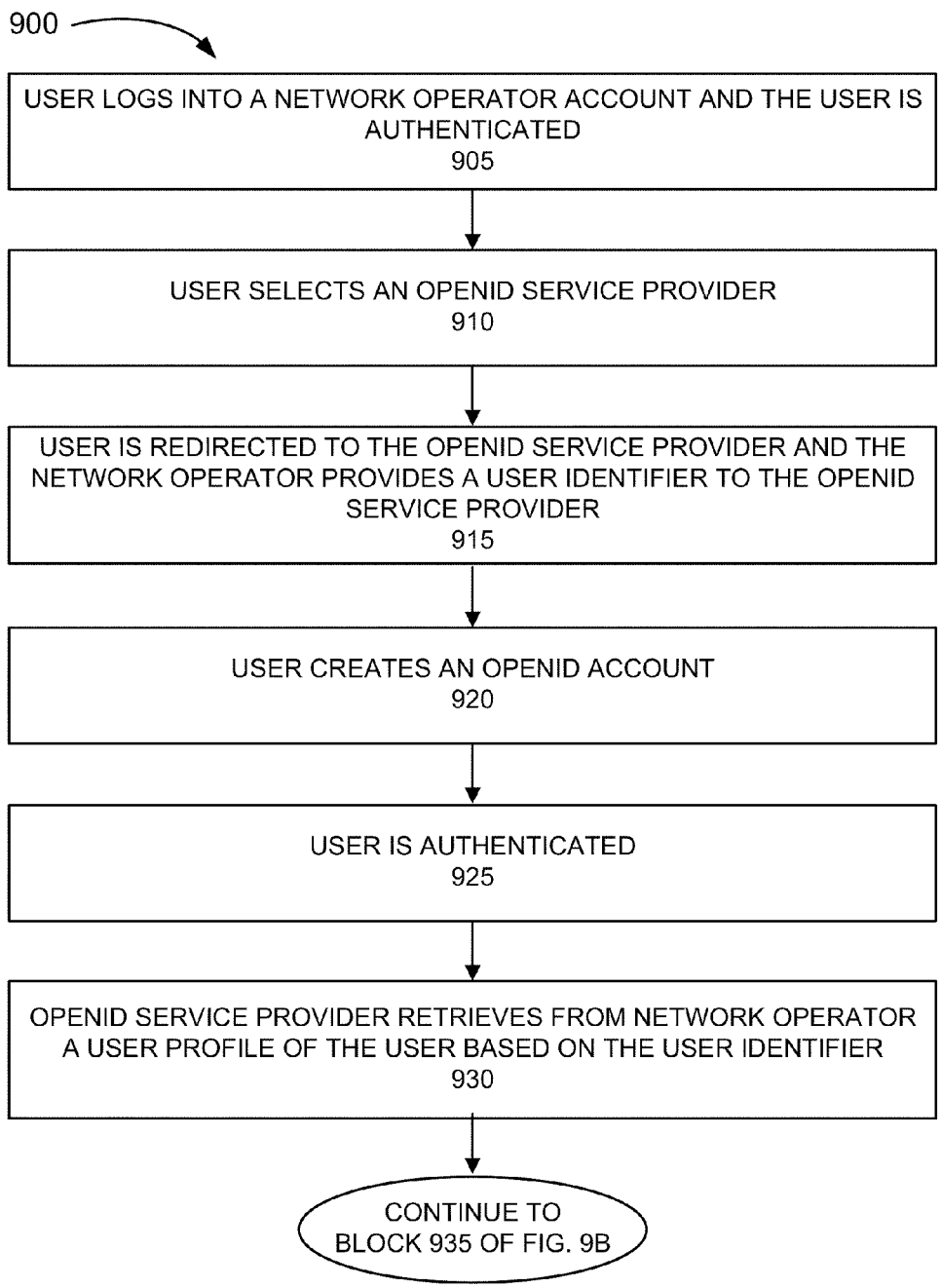
FIGS. 9A and 9B are flow diagrams illustrating an exemplary process that allows an OpenID service provider network device to retrieve user data from a network operator network device with which the user data may be used to create an OpenID account for a user.
Figure 9B:
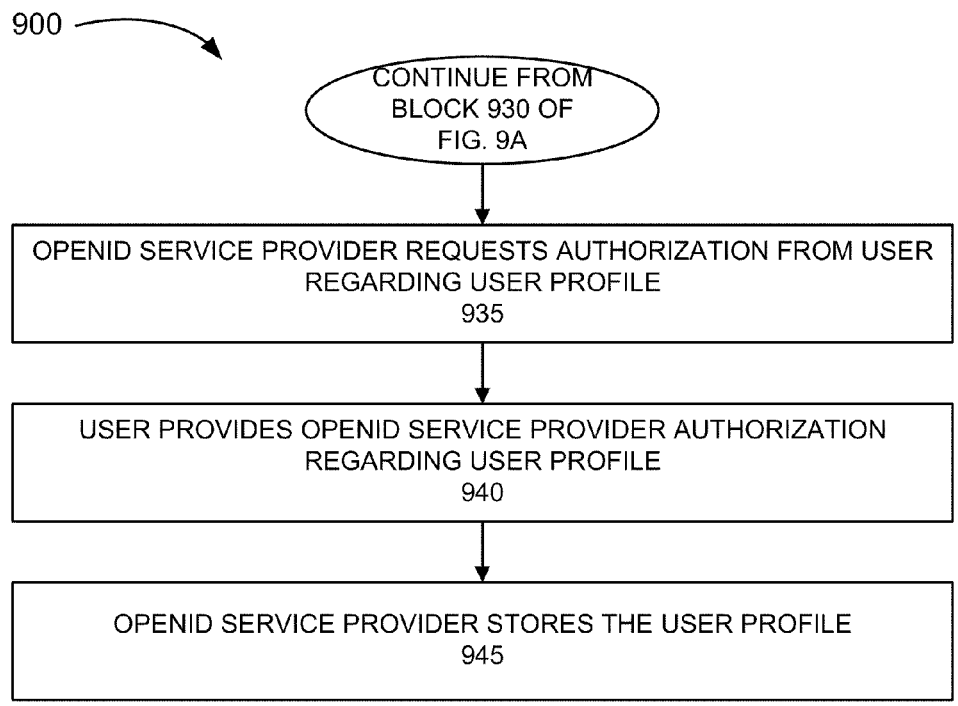

FIGS. 9A and 9B are flow diagrams illustrating an exemplary process 900 that allows an OpenID service provider network device to retrieve user data from a network operator network device with which the user data may be used to create an OpenID account for a user.

Process 900 may include a user logging into a network operator account and getting authenticated (block 905). By way of example, but not limited thereto, end device 105 may communicate with a network operator network device (e.g., portal server 145 of network operator network 140). Portal device 145 may provide an interface (e.g., a web-based GUI) with which user 110 via end device 105 may log into a network operator account. User 110 may be a subscriber of network operator network 140. Portal device 145 via the interface may authenticate user 110 (e.g., requiring user 110 to enter a password, a user name, user data, challenge questions, etc.).

The user may select an OpenID service provider (block 910). By way of example, but not limited thereto, portal device 145 via the interface permits user 110 to select an OpenID service provider. In some instances, the network operator and the OpenID service provider may be the same party (e.g., network operator network 140 provides OpenID services). In other instances, the network operator and the OpenID service provider may not be the same party. Portal service 145 receives the user's selection of an OpenID service provider.

The user may be redirected to the OpenID service provider and the network operator provides a user identifier to the OpenID service provider (block 915). By way of example, but not limited thereto, portal server 145 may redirect end device 105 (e.g., a web browser residing on end device 105 may be redirected) to an OpenID service provider network device (e.g., an OpenID server 125 of OpenID service provider network 120). Portal device 145 may provide, via a redirect message, a user identifier associated with user 110, to an OpenID server 125. According to an exemplary implementation, the redirect message may conform to the SAML standard. According to other implementations, other types of messages and/or other standards may be utilized.

The user may create an OpenID account (block 920). By way of example, but not limited thereto, OpenID server 125 may provide an interface (e.g., a web-based GUI) with which user 110 may create, via end device 105, an OpenID account. According to an exemplary implementation, OpenID server 125 may request information from user 110 for authenticating purposes (e.g., a password, an OpenID identifier, e-mail address, etc.).

The user may be authenticated (block 925). OpenID server 125 may authenticate user 110. By way of example, but not limited thereto, OpenID server 125 (or another OpenID service provider network device of OpenID service provider network 120) may send a message (e.g., an e-mail, an SMS message, etc.) to user 110. Additionally, or alternatively, OpenID server 125 (or another OpenID service provider network device of OpenID service provider network 120) may obtain SIM card credentials, etc. OpenID server 125 may utilize username/password credentials, etc., to authenticate user 110.

The OpenID service provider may retrieve from the network operator a user profile of the user based on the user identifier (block 930). By way of example, but not limited thereto, once user 110 has been successfully authenticated, OpenID server 125 may retrieve user data from a network operator network device (e.g., user database 150 of network operator network 140) based on the received user identifier. For example, OpenID server 125 may query user database 150 using the user identifier. OpenID server 125 may temporarily store the retrieved user data.

The OpenID service provider may request authorization from user regarding user profile (block 935). By way of example, but not limited thereto, OpenID server 125 may provide an interface (e.g., a web page) to allow user 110, via end device 105, to select user data to be used by OpenID server 125 and authorize the use of the selected user data.

The user may provide OpenID service provider authorization regarding the user profile (block 940). User 110 may select user data and provide authorization regarding the user data, via end device 105, to OpenID server 125.

The OpenID service provider may store the user profile (block 945). By way of example, but not limited thereto, OpenID server 125 may store the retrieved user data or a portion thereof (user data that user 110 selected), which has been authorized by user 110, to an OpenID service provider network device (e.g., user database 127). OpenID server 125 may utilize the user data for OpenID account purposes (e.g., to populate data fields associated with the OpenID account). In this way, user 110 may not need to provide OpenID server 125 with user data (e.g., by entering user data via end device 105) when creating the OpenID account.

Although FIGS. 9A and 9B illustrate an exemplary process 900 for allowing an OpenID service provider network device to retrieve user data from a network operator network device with which the user data may be used to create an OpenID account for a user, in other implementations, process 900 may include additional operations, fewer operations, and/or different operations than those illustrated in FIGS. 9A and 9B described.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the processes illustrated in FIGS. 5A and 5B and FIGS. 9A and 9B, the order of the blocks may be modified in other implementations. Further, non-dependent blocks may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. By way of example, this logic or this component may include hardware, such as one or more processors, one or more microprocessors, one or more ASICs, one or more FPGAs, etc., a combination of hardware and software, a combination of hardware and firmware, or a combination of hardware, software, and firmware.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
receiving, by an OpenID network device and from an end device, a user log in to a single sign-on service;
logging in, by the OpenID network device, the end device to an OpenID account that provides the single sign-on service;
receiving, by the OpenID network device and from a third party service provider network device, a request to authenticate a user associated with the end device and a request to receive user data associated with the user;
providing, by the OpenID network device, a user interface to the end device to allow the user to confirm his/her sign-in to the third party service provider network device and confirm a release of the user data;
receiving, by the OpenID network device and from the end device, a confirmation with regard to the user's sign-in to the third party service provider network device and the release of the user data; and
sending, by the OpenID network device and to the third party service provider network device, a message including an indication that the user is authenticated and the user data.

2. The method of claim 1, further comprising:
sending, by the third party service provider network device and to a network operator network with which the user is a subscriber, a request to utilize resources of the network operator network, wherein the request includes the user data.

3. The method of claim 2, further comprising:
providing, by the network operator network and to the third party service provider network device, a response.

4. The method of claim 3, wherein the user data includes a mobile phone number of the user and the response includes a location of the user.

5. The method of claim 3, wherein the response includes a buddy list associated with the user.

6. The method of claim 1, further comprising:
logging on, by the end device to the third party service provider network device, using an OpenID identifier that identifies the user as a subscriber to the single sign-on service;
discovering, by the third party service provider network device, the OpenID network device; and
causing, by the third party service provider network device, the end device to be redirected to the OpenID network device associated with an OpenID service provider.

7. A method comprising:
receiving, by a network operator network device and from an end device, a log-in of a user to a user account;
providing, by the network operator network device and to the end device, a user interface to allow the user to select an OpenID service provider that provides a single sign-on service;
receiving, by the network operator network device and from the end device, a user selection of an OpenID service provider;
causing, by the network operator network device, the end device to be redirected to an OpenID service provider network device associated with the OpenID service provider;
providing, by the network operator network device and to the OpenID service provider network device, a user identifier that identifies the user;
receiving, by the network operator network device and from the OpenID service provider network device, a request for user data associated with the user, wherein the request includes the user identifier;
sending, by the OpenID service provider network device and to the end device, the user data;
receiving, by the OpenID service provider network device and from the end device, an authorization from the user to use the user data or a portion of the user data to create an OpenID service account pertaining to a single sign-on service; and
creating the OpenID service account using the user data or the portion of the user data.

8. The method of claim 7, further comprising:
providing, by the network operator network device, a web portal to allow the user to log-in to the user account.

9. The method of claim 7, further comprising:
receiving, by the OpenID service provider network device and from the end device, a user request to create an OpenID service account.

10. The method of claim 9, further comprising:
authenticating, by the OpenID service provider network device, the user.

11. The method of claim 7, further comprising:
receiving, by the OpenID service provider network device and from the end device, a user selection to indicate which user data can be used as the user data to create the OpenID service account.

12. A network device comprising:
a communication interface;
a memory that stores instructions; and
a processor to execute the instructions to:
provide OpenID services that includes a single sign-on service;
receive, via the communication interface, a log-in to an OpenID account, which provides the single sign-on service, by an end device associated with a user;
receive, via the communication interface, a request to authenticate the user and to receive user data associated with the user from another network device;

provide, via the communication interface, a user interface to the end device to allow the user to confirm his/her sign-in to the other network device and confirm a release of the user data to the other network device;

receive, via the communication interface, a confirmation via the user interface with regard to the user's sign-in to the other network device and the release of the user data to the other network device; and send, via the communication interface, to the other network device a message including an indication that the user is authenticated and the user data.

13. The network device of claim 12, wherein the processor to execute the instructions to:

cause the end device to be redirected to the other network device once the confirmation is received.

14. The network device of claim 12, wherein the network device comprises an OpenID server.

15. The network device of claim 12, wherein the processor to execute the instructions to:

retrieve the user data from a user database.

16. A network device comprising:
a communication interface;
a memory that stores instructions; and
a processor to execute the instructions to:

provide OpenID services that include a single sign-on service;

receive, via the communication interface, a user identifier of a user from another network device;

receive, via the communication interface, a request from an end device associated with the user to create an OpenID account pertaining to the single sign-on service;

send, via the communication interface, a request for user data associated with the user, wherein the request includes the user identifier;

receive, via the communication interface, the user data;

provide, via the communication interface, a user interface that includes the user data to the user via the end device, wherein the user interface permits the user to authorize use of the user data or a portion of the user data to create the OpenID account;

receive, via the communication interface and the user interface, an authorization of the user to utilize the user data or the portion of the user data; and create the OpenID account using the user data or the portion of the user data.

17. The network device of claim 16, wherein the processor to execute the instructions to:

generate the user interface to permit the user to select particular user data to be utilized to create the OpenID account and permit the user to select particular user data to not be utilized to create the OpenID account.

18. A network device comprising:
a communication interface;
a memory that stores instructions; and
a processor to execute the instructions to:

provide a service, an asset, information, or a function to users;

provide, via the communication interface, an OpenID user interface to permit a user to sign-in to OpenID services that include a single sign-on service;

receive, via the communication interface, via the OpenID user interface an OpenID identifier pertaining to the single sign-on service and the user;

discover an OpenID service provider network device associated with the user in response to a receipt of the OpenID identifier;

request, via the communication interface, authentication of the user and user data from the OpenID service provider network device, wherein a request includes the OpenID identifier; and receive, via the communication interface, authentication of the user and the user data from the OpenID service provider network device.

19. The network device of claim 18, wherein the network device comprises an application server.

20. The network device of claim 18, wherein the processor to execute the instructions to:

send a resource request to utilize network resources associated with a network operator network with which the user is a subscriber and is provided network access, wherein the resource request includes the user data; and provide the service to the user based on a response from the network operator network.

21. The network device of claim 20, wherein the service comprises providing a map of the user's current surroundings and the response includes coordinates of the user.

* * * * *